US009096133B2

(12) United States Patent
Kohler et al.

(10) Patent No.: US 9,096,133 B2
(45) Date of Patent: Aug. 4, 2015

(54) ELECTRIC VEHICLE WITH RANGE EXTENDER

(75) Inventors: Beat Kohler, Kirchberg (CH); Marcel Frei, Muenchenbuchsee (CH); Peter Johannes Erasmus, Mellingen (CH); Stephen G. Crain, Hudson, WI (US); Travis N. Theiss, Maple Grove, WI (US); Stacey E. Stewart, Sillwater, MN (US)

(73) Assignee: Polaris Industries Inc., Medina, MN (US)

( * ) Notice: Subject to any disclaimer, the term of this patent is extended or adjusted under 35 U.S.C. 154(b) by 324 days.

(21) Appl. No.: 13/441,537

(22) Filed: Apr. 6, 2012

(65) Prior Publication Data
US 2012/0255799 A1    Oct. 11, 2012

Related U.S. Application Data

(60) Provisional application No. 61/473,643, filed on Apr. 8, 2011, provisional application No. 61/482,539, filed on May 4, 2011.

(51) Int. Cl.
*B60K 6/46* (2007.10)
*B60L 11/12* (2006.01)
(Continued)

(52) U.S. Cl.
CPC .............. *B60L 11/126* (2013.01); *B60L 1/003* (2013.01); *B60L 3/0023* (2013.01); *B60L 11/14* (2013.01);
(Continued)

(58) Field of Classification Search
CPC ... B60L 11/126; B60L 11/1877; B60L 11/14; B60L 11/1861; B60L 11/1864; B60L 11/1868; B60L 1/003; B60L 3/0023; B60L 2210/10; B60L 2210/30; B60L 2210/40; B60L 2210/12; B60L 2260/28; B60L 2200/22; B60L 2240/12; B60L 2240/34; B60L 2240/36; B60L 2240/421; Y02T 10/7077; Y02T 10/7005; Y02T 10/7241; Y02T 10/7216; Y02T 10/7011; Y02T 10/6217; Y02T 10/7044; Y02T 10/7233; Y02T 10/7066; Y02T 10/7061; Y02T 10/642
USPC ................................. 180/65.245, 65.22, 68.5
See application file for complete search history.

(56) References Cited

U.S. PATENT DOCUMENTS 7,775,311 B1 * 8/2010 Hardy et al. .................. 180/68.5
8,256,549 B2 * 9/2012 Crain et al. ................. 180/65.31
(Continued)

FOREIGN PATENT DOCUMENTS

WO    WO2004/067361 A1    8/2004
WO    WO2008/115463 A1    9/2008

OTHER PUBLICATIONS

International Preliminary Report on Patentability issued by the International Bureau of WIPO, Geneva, Switzerland, Mar. 4, 2014, for International Application No. PCT/US2012/032510; 5 pgs.
(Continued)

*Primary Examiner* — Hau Phan
*Assistant Examiner* — Jacob Meyer
(74) *Attorney, Agent, or Firm* — Faegre Baker Daniels LLP

(57) ABSTRACT

A utility vehicle is disclosed having an electric drive. The drivetrain is comprised of batteries, a motor, a transaxle driven by the motor, a rear differential driven by the transaxle, and a prop shaft which is driven by the transaxle and drives a front differential. The batteries are provided in two groups and are supported on the frame of the vehicle. An on-board range extender is provided to charge the batteries and/or to provide power to the motor.

13 Claims, 37 Drawing Sheets

(51) Int. Cl.
*B60L 11/18* (2006.01)
*B60L 1/00* (2006.01)
*B60L 3/00* (2006.01)
*B60L 11/14* (2006.01)

(52) U.S. Cl.
CPC ......... *B60L 11/1861* (2013.01); *B60L 11/1864* (2013.01); *B60L 11/1868* (2013.01); *B60L 11/1877* (2013.01); *B60L 2200/22* (2013.01); *B60L 2210/10* (2013.01); *B60L 2210/12* (2013.01); *B60L 2210/30* (2013.01); *B60L 2210/40* (2013.01); *B60L 2240/12* (2013.01); *B60L 2240/34* (2013.01); *B60L 2240/421* (2013.01); *B60L 2260/28* (2013.01); *Y02T 10/6217* (2013.01); *Y02T 10/642* (2013.01); *Y02T 10/7005* (2013.01); *Y02T 10/7011* (2013.01); *Y02T 10/7044* (2013.01); *Y02T 10/7061* (2013.01); *Y02T 10/7066* (2013.01); *Y02T 10/7077* (2013.01); *Y02T 10/7216* (2013.01); *Y02T 10/7233* (2013.01); *Y02T 10/7241* (2013.01)

(56) References Cited

U.S. PATENT DOCUMENTS

| | | | | |
|---|---|---|---|---|
| 8,269,457 | B2* | 9/2012 | Wenger et al. | 320/109 |
| 8,302,724 | B2* | 11/2012 | Gillingham et al. | 180/242 |
| 8,323,147 | B2* | 12/2012 | Wenger et al. | 477/3 |
| 8,662,239 | B2* | 3/2014 | Takagi | 180/291 |
| 2008/0308334 | A1* | 12/2008 | Leonard et al. | 180/89.1 |
| 2009/0000849 | A1* | 1/2009 | Leonard et al. | 180/311 |
| 2009/0071737 | A1* | 3/2009 | Leonard et al. | 180/68.4 |
| 2009/0071739 | A1* | 3/2009 | Leonard et al. | 180/209 |
| 2009/0091101 | A1* | 4/2009 | Leonard et al. | 280/638 |
| 2009/0121518 | A1* | 5/2009 | Leonard et al. | 296/183.1 |
| 2009/0301830 | A1* | 12/2009 | Kinsman et al. | 188/289 |
| 2009/0302590 | A1* | 12/2009 | Van Bronkhorst et al. | 280/756 |
| 2010/0147606 | A1* | 6/2010 | Kalenborn et al. | 180/65.21 |
| 2010/0314182 | A1* | 12/2010 | Crain et al. | 180/60 |
| 2010/0314183 | A1* | 12/2010 | Olsen et al. | 180/65.1 |
| 2010/0314184 | A1* | 12/2010 | Stenberg et al. | 180/65.6 |
| 2010/0317484 | A1* | 12/2010 | Gillingham et al. | 477/7 |
| 2010/0317485 | A1* | 12/2010 | Gillingham et al. | 477/7 |
| 2010/0320959 | A1* | 12/2010 | Tomberlin et al. | 320/101 |
| 2012/0209463 | A1* | 8/2012 | Gibbs et al. | 701/22 |
| 2013/0006458 | A1* | 1/2013 | Bhattarai et al. | 701/22 |
| 2013/0060410 | A1* | 3/2013 | Crain et al. | 701/22 |

OTHER PUBLICATIONS

International Search Report issued by the European Patent Office, Rijswijk, Netherlands, Feb. 21, 2014, for International Application No. PCT/US2012/032510; 5 pgs.

Written Opinion issued by the European Patent Office, Rijswijk, Netherlands, Feb. 21, 2014, for International Application No. PCT/US2012/032510; 4 pgs.

* cited by examiner

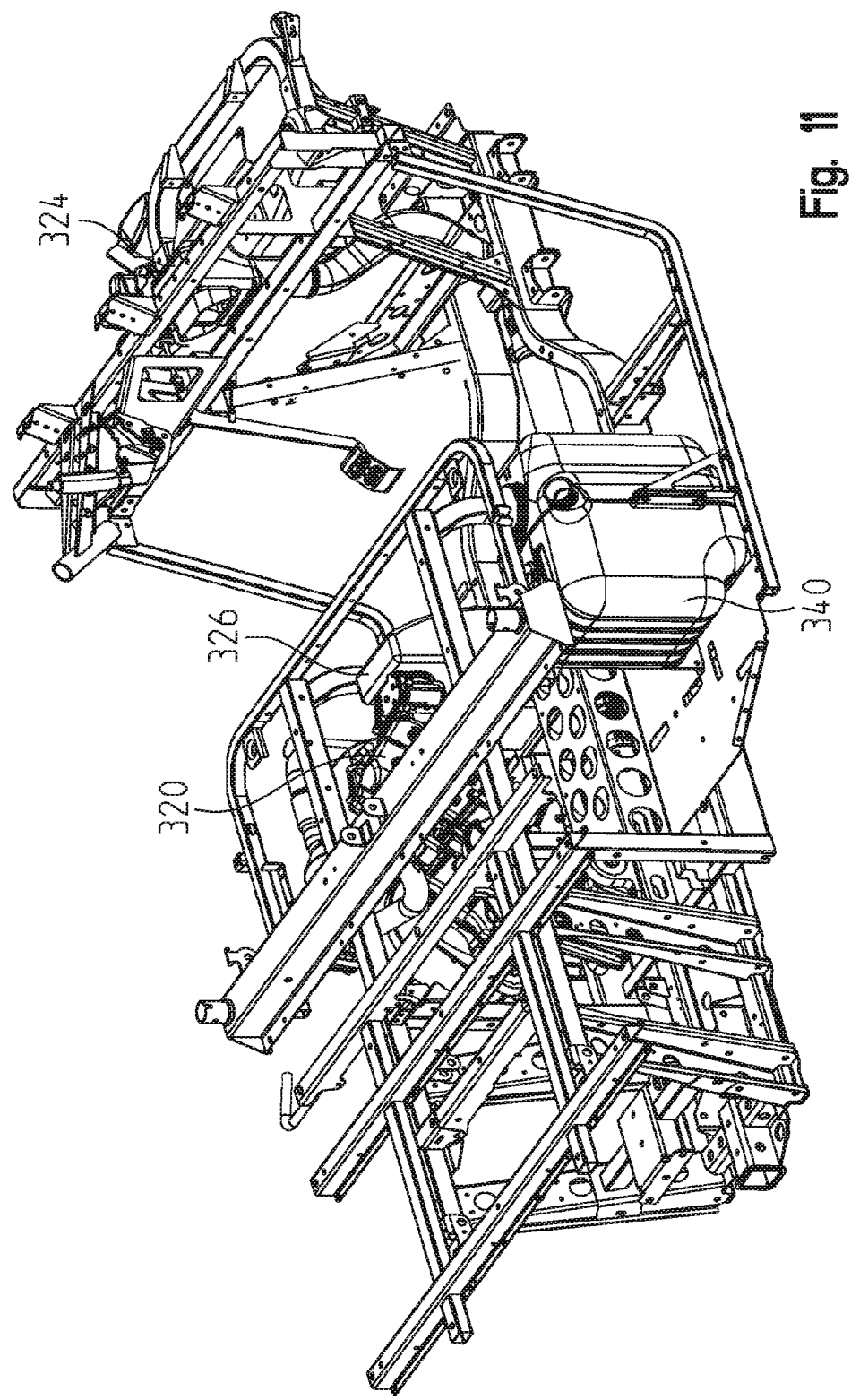

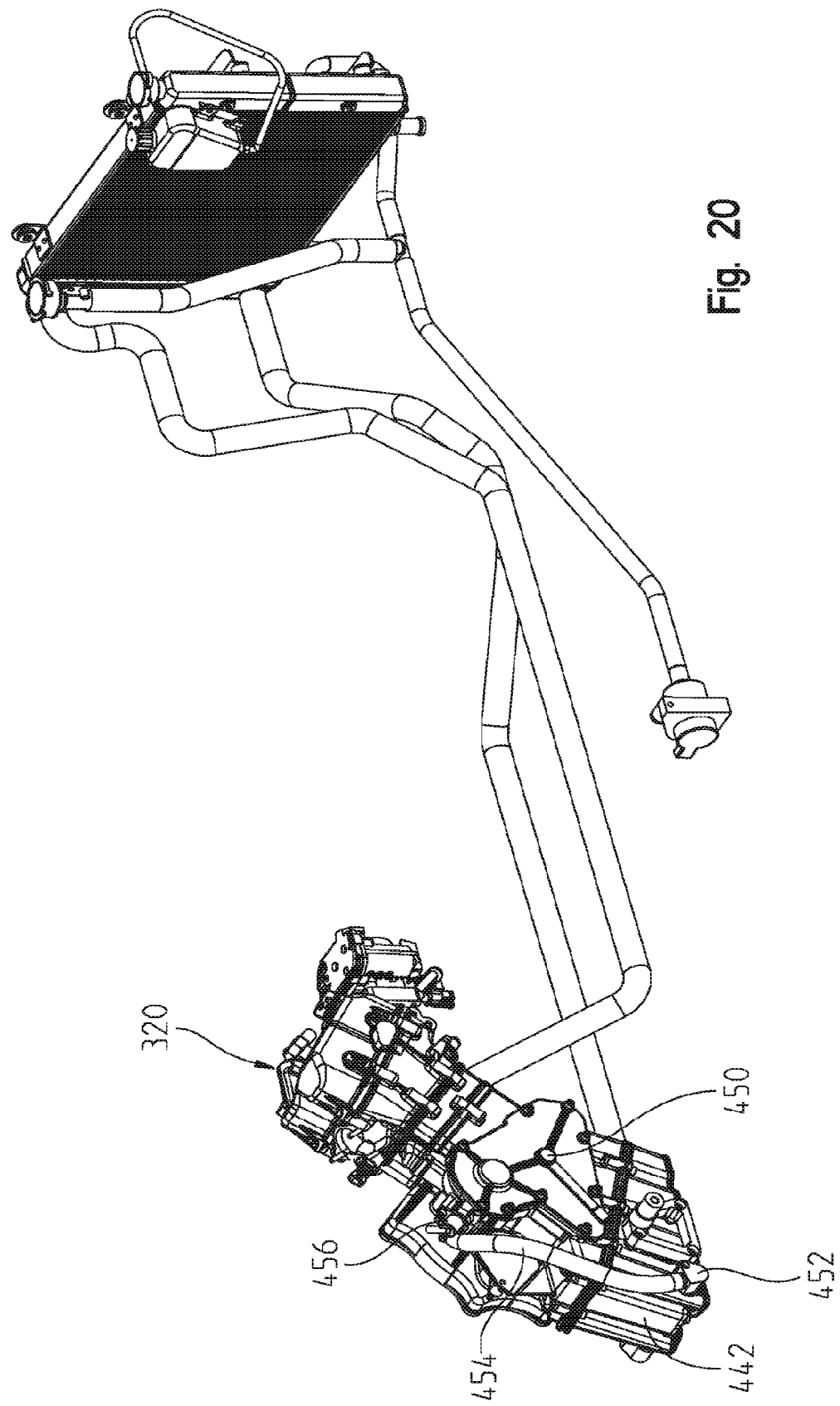

ELECTRIC VEHICLE WITH RANGE EXTENDER

CROSS-REFERENCE TO RELATED APPLICATIONS

This application claims priority to U.S. Provisional Patent Application Ser. No. 61/473,643, filed Apr. 8, 2011, titled "ELECTRIC VEHICLE WITH RANGE EXTENDER," and U.S. Provisional Patent Application Ser. No. 61/482,539, filed May 4, 2011, titled "ELECTRIC VEHICLE WITH RANGE EXTENDER," the complete disclosures of which are expressly incorporated by reference herein.

BACKGROUND

The present invention relates generally to a drive system for a vehicle and in particular to an electric vehicle having an on-board generator system.

SUMMARY

The present disclosure relates to vehicles, including utility vehicles. The present disclosure relates to utility vehicles having an electric drive train, and more particularly to battery operated vehicles having an on-board generator system, or range extender, and configured with multiple-wheel drive capabilities (e.g., four-wheel drive, all-wheel drive).

In an exemplary embodiment of the present disclosure, a utility vehicle is provided comprising a frame having a front portion, mid portion and rear portion, the frame having a longitudinal centerline; front and rear wheels supporting the frame; side by side seating positioned adjacent the frame mid portion; a tunnel portion extending parallel to the longitudinal centerline and under the side by side seating; an electric drive-train supported by the frame, and comprising an electric motor positioned rearward of the side by side seating and drivingly coupled to the rear wheels, a drive shaft extending through the tunnel and extending forwardly and being drivingly coupled to the front wheels, and at least one battery supported by the tunnel and positioned under the side by side seating; an engine generator assembly positioned under the side by side seating and electrically coupled to the battery; and a fuel tank for storing fuel for the engine generator.

In another exemplary embodiment of the present disclosure, a utility vehicle comprises a frame having a front portion, mid portion and rear portion, the frame having a longitudinal centerline; a plurality of ground engaging members supporting the frame; side by side seating positioned adjacent the frame mid portion; an electric drive-train supported by the frame, and comprising an electric motor positioned rearward of the side by side seating and drivingly coupled to at least one of the ground engaging members, and at least one battery supported by the tunnel and positioned under the side by side seating; an engine generator assembly positioned under the side by side seating and electrically coupled to the battery; and a fuel tank for storing fuel for the engine generator. The vehicle has a total weight of W with the fuel tank filled, the allotted weight for the fuel tank and fuel is in the range of 1.5 to 3.5% of W, and the weight of the battery is in the range of 15 to 25% of W.

In a further illustrative embodiment of the present disclosure, a vehicle comprises a frame having a front portion, mid portion and rear portion. The frame has a longitudinal centerline. The vehicle further comprises a plurality of ground engaging members supporting the frame; side by side seating positioned adjacent the frame mid portion; and an electric drive-train supported by the frame. The electric drive-train includes an electric motor positioned rearward of the side by side seating and drivingly coupled to at least one of the ground engaging members, and at least one battery positioned under the side by side seating. The vehicle also comprises an engine generator assembly positioned under the side by side seating and electrically coupled to the battery, and a fuel tank for storing fuel for the engine generator. The vehicle has a total weight of up to approximately 2,750 pounds.

Additionally, an illustrative embodiment of the present disclosure includes a vehicle comprising a frame; a plurality of ground engaging members supporting the frame and configured to move the vehicle; and an operator area supported by the frame and including a seating assembly. The vehicle further comprises an electric motor drivingly coupled to at least a portion of the ground engaging members; at least one battery electrically coupled to the electric motor; and a range-extender assembly electrically coupled to the at least one battery and the electric motor. The range-extender assembly includes an engine and a generator operably coupled to the engine. The range-extender assembly provides electrical power to at least one of the electric motor and the at least one battery and is configured to maintain a state-of-charge of the at least one battery during operation of the vehicle of up to approximately 50 miles/hour. The vehicle is configured to operate in at least an electric mode and a range-extender mode, and auxiliary electric power is provided by the at least one battery when in the electric mode, and auxiliary electric power is provided by the range-extender assembly when in the range-extender mode.

A further illustrative embodiment of the present disclosure includes s vehicle comprising a frame; a plurality of ground engaging members supporting the frame and configured to move the vehicle; and an operator cabin area supported by the frame and including a seating assembly. Additionally, the vehicle comprises an electric motor drivingly coupled to at least a portion of the ground engaging members; at least one battery electrically coupled to the electric motor; and a range-extender assembly electrically coupled to the at least one battery and the electric motor. The range-extender assembly includes an engine and a generator operably coupled to the engine. The range-extender assembly provides electrical power to at least one of the electric motor and the at least one battery. The vehicle is configured to operate in at least an electric mode and a range-extender mode, and auxiliary electric power is provided by the at least one battery when in the electric mode. Auxiliary electric power is provided by the range-extender assembly when in the range-extender mode. The vehicle further comprises an engine cooling system comprising circulating coolant; and a cabin temperature control system for heating the operator area. The control system is fluidly coupled to the engine cooling system for generating heated air for the operator cabin area.

Another illustrative embodiment of the present disclosure includes a vehicle comprising a frame; a plurality of ground engaging members supporting the frame and configured to move the vehicle; and an operator area supported by the frame and including a seating assembly. The vehicle further comprises an electric motor drivingly coupled to at least a portion of the ground engaging members, and an electrical system including at least one battery and a vehicle control unit. The electrical system is operably coupled to the electric motor. Additionally, the vehicle comprises a range-extender assembly electrically coupled to the electrical system and the electric motor. The range-extender assembly includes an engine and a generator operably coupled to the engine. The range-extender assembly is configured to provide electrical power to the electric motor and the at least one battery. Also, the vehicle control unit is configured to control the electrical power provided by the range-extender assembly to the at least one battery in response to a state-of-charge of the at least one battery. In particular, the vehicle control unit is configured to increase the electrical power provided by the range extender assembly to the at least one battery when the state-of-charge is less than a predetermined level, and the vehicle control unit is configured to decrease the electrical power provided by the range extender assembly to the at least one battery when the state-of-charge is greater than the predetermined level.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 11 illustrates a rear right perspective view of the utility vehicle of FIG. 8;

FIG. 20 illustrates a rear perspective view of the cooling system of FIG. 19;

DETAILED DESCRIPTION OF THE DRAWINGS

Figure 1:
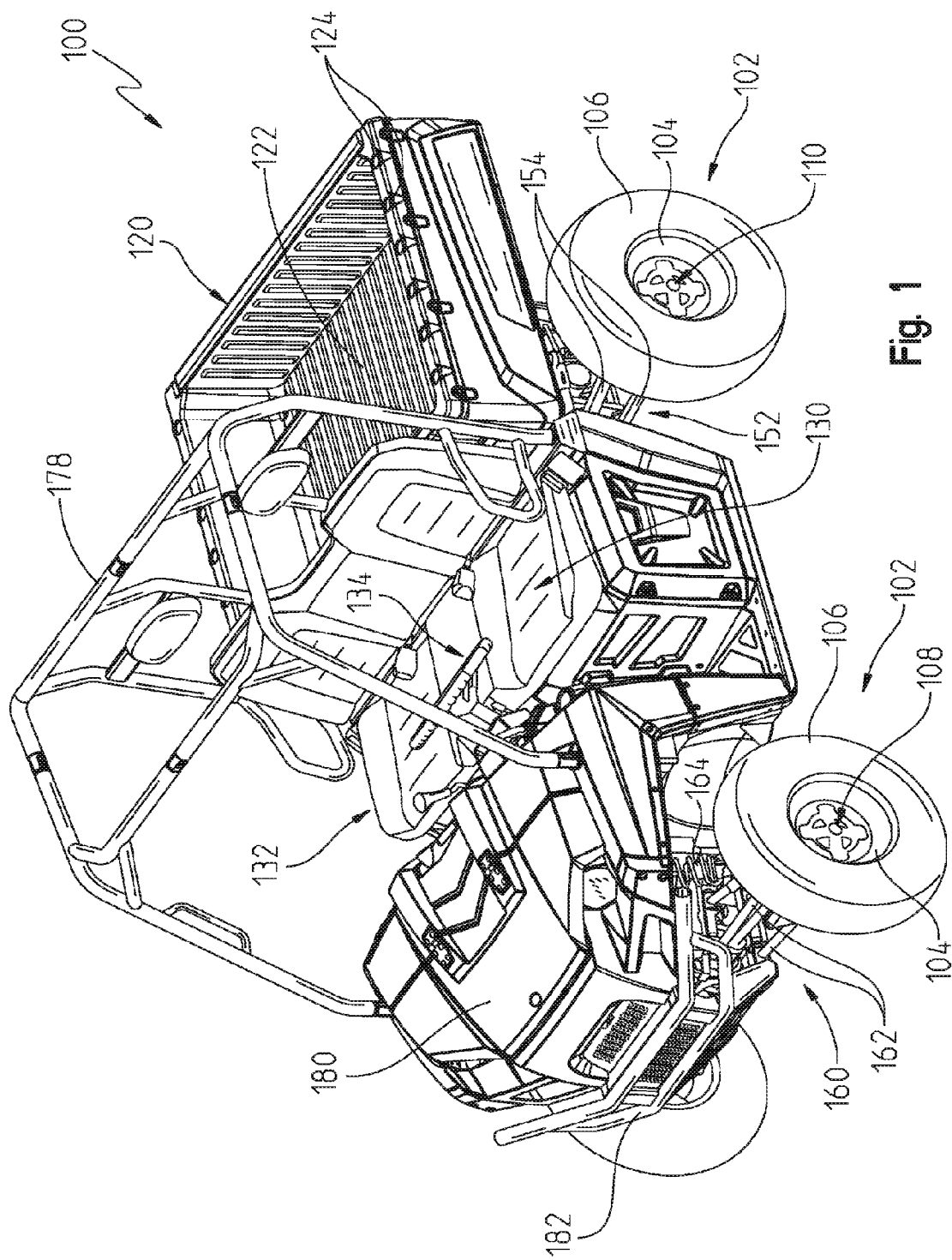
FIG. 1 is a perspective view of an exemplary utility vehicle.

Corresponding reference characters indicate corresponding parts throughout the several views. Unless stated otherwise the drawings are proportional.

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, people movers, and golf carts.

Reference is made to our pending applications utility applications, U.S. patent application Ser. Nos. 12/484,921; 12/816,004; 12/816,095; 12/816,052; and Ser. No. 12/815,907; all relating to an electrical vehicle, the subject matter of which is incorporated herein by reference.

Referring to FIG. 1, an illustrative embodiment of a vehicle 100 is shown. Vehicle 100 as illustrated includes a plurality of ground engaging members 102. Illustratively, ground engaging members 102 are wheels 104 and associated tires 106. Other exemplary ground engaging members include skis and tracks. In one embodiment, one or more of the wheels may be replaced with tracks, such as the Prospector II Tracks available from Polaris Industries, Inc. located at 2100 Highway 55 in Medina, Minn. 55340.

In addition to vehicle 100, the teachings of the present disclosure may be used in combination with the suspension systems, drive configurations, modular sub-sections, and other features described in any one of U.S. Provisional Patent Application Ser. No. 60/918,502, titled VEHICLE, filed Mar. 16, 2007; U.S. Provisional Patent Application Ser. No. 60/918,556, titled VEHICLE, filed Mar. 16, 2007; U.S. Provisional Patent Application Ser. No. 60/918,444, titled VEHICLE WITH SPACE UTILIZATION, filed Mar. 16, 2007; U.S. Provisional Patent Application Ser. No. 60/918, 356, titled UTILITY VEHICLE HAVING MODULAR COMPONENTS, filed Mar. 16, 2007; U.S. Provisional Patent Application Ser. No. 60/918,500, titled METHOD AND APPARATUS RELATED TO TRANSPORTABILITY OF A VEHICLE, filed Mar. 16, 2007; U.S. Utility Patent Application Ser. No. 12/050,048, titled VEHICLE WITH SPACE UTILIZATION, filed Mar. 17, 2008; U.S. Utility patent application Ser. No. 12/050,064, titled VEHICLE WITH SPACE UTILIZATION, filed Mar. 17, 2008; U.S. Utility patent application Ser. No. 12/050,041, titled METHOD AND APPARATUS RELATED TO TRANSPORTABILITY OF A VEHICLE, filed Mar. 17, 2008; U.S. Utility patent application Ser. No. 12/092,151, titled UTILITY VEHICLE HAVING MODULAR COMPONENTS, filed Apr. 30, 2008; U.S. Utility patent application Ser. No. 12/092,153, titled VEHICLE, filed Apr. 30, 2008; U.S. Utility patent application Ser. No. 12/092,191, titled VEHICLE, filed Apr. 30, 2008, U.S. Utility patent application Ser. No. 12/135,107, titled VEHICLE, filed Jun. 6, 2008, U.S. Utility patent application Ser. No. 12/134,909, titled SUSPENSION SYSTEMS FOR A VEHICLE, filed Jun. 6, 2008, U.S. Utility patent application Ser. No. 12/218,572, titled FLOORBOARD FOR A VEHICLE, filed Jul. 16, 2008, and U.S. Utility patent application Ser. No. 12/317,298, titled VEHICLE, filed Dec. 22, 2008, the disclosures of which are expressly incorporated by reference herein.

Figure 3:
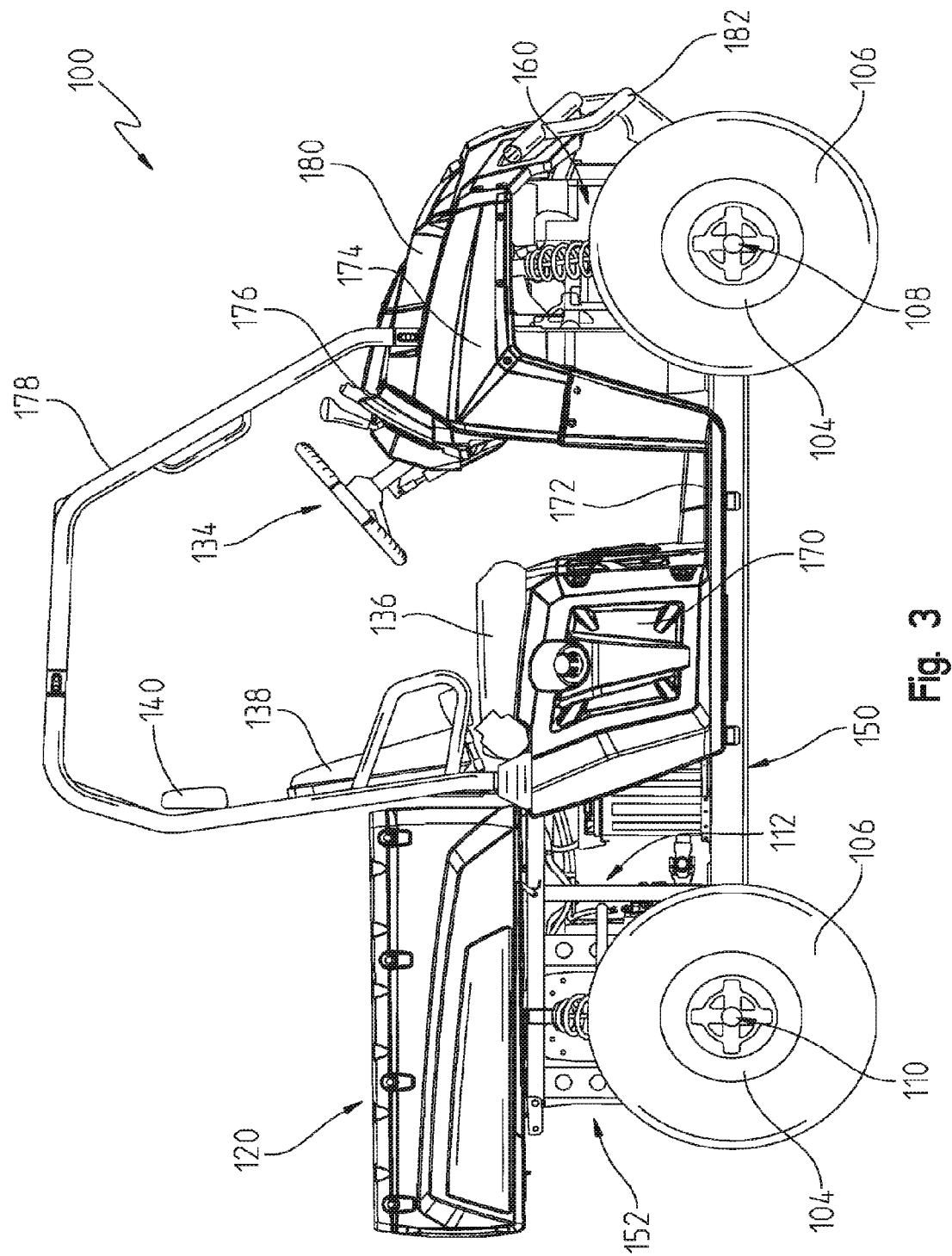
FIG. 3 illustrates a right side view of the exemplary utility vehicle of FIG. 1.

Referring to the illustrated embodiment in FIG. 1, a first set of wheels, one on each side of vehicle 100, generally correspond to a front axle 108. A second set of wheels, one on each side of vehicle 100, generally correspond to a rear axle 110. Although each of front axle 108 and rear axle 110 are shown having a single ground engaging members 102 on each side, multiple ground engaging members 102 may be included on each side of the respective front axle 108 and rear axle 110. As configured in FIG. 1, vehicle 100 is a four wheel, two axle vehicle powered by a drivetrain 112 (FIG. 3). As mentioned herein, one or more of ground engaging members 102 are operatively coupled to drivetrain 112 to power the movement of vehicle 100, as further described herein.

Vehicle 100 includes a bed 120 having a cargo carrying surface 122. Cargo carrying surface 122 may be flat, contoured, and/or comprised of several sections. Bed 120 further includes a plurality of mounts 124 for receiving an expansion retainer (not shown) which may couple various accessories to bed 120. Additional details of such mounts and expansion retainers are provided in U.S. Pat. No. 7,055,454, to Whiting et al., filed Jul. 13, 2004, titled "Vehicle Expansion Retainers," the disclosure of which is expressly incorporated by reference herein. Further reference is made to our pending applications, U.S. patent application Ser. No. 12/135,107 filed Jun. 6, 2008, entitled "VEHICLE"; Ser. No. 12/134,909 filed Jun. 6, 2008, entitled "SUSPENSION SYSTEMS FOR A VEHICLE;" and Ser. No. 12/317,298 filed Dec. 22, 2008, entitled "VEHICLE", the disclosures of which are expressly incorporated by reference herein.

Figure 2:
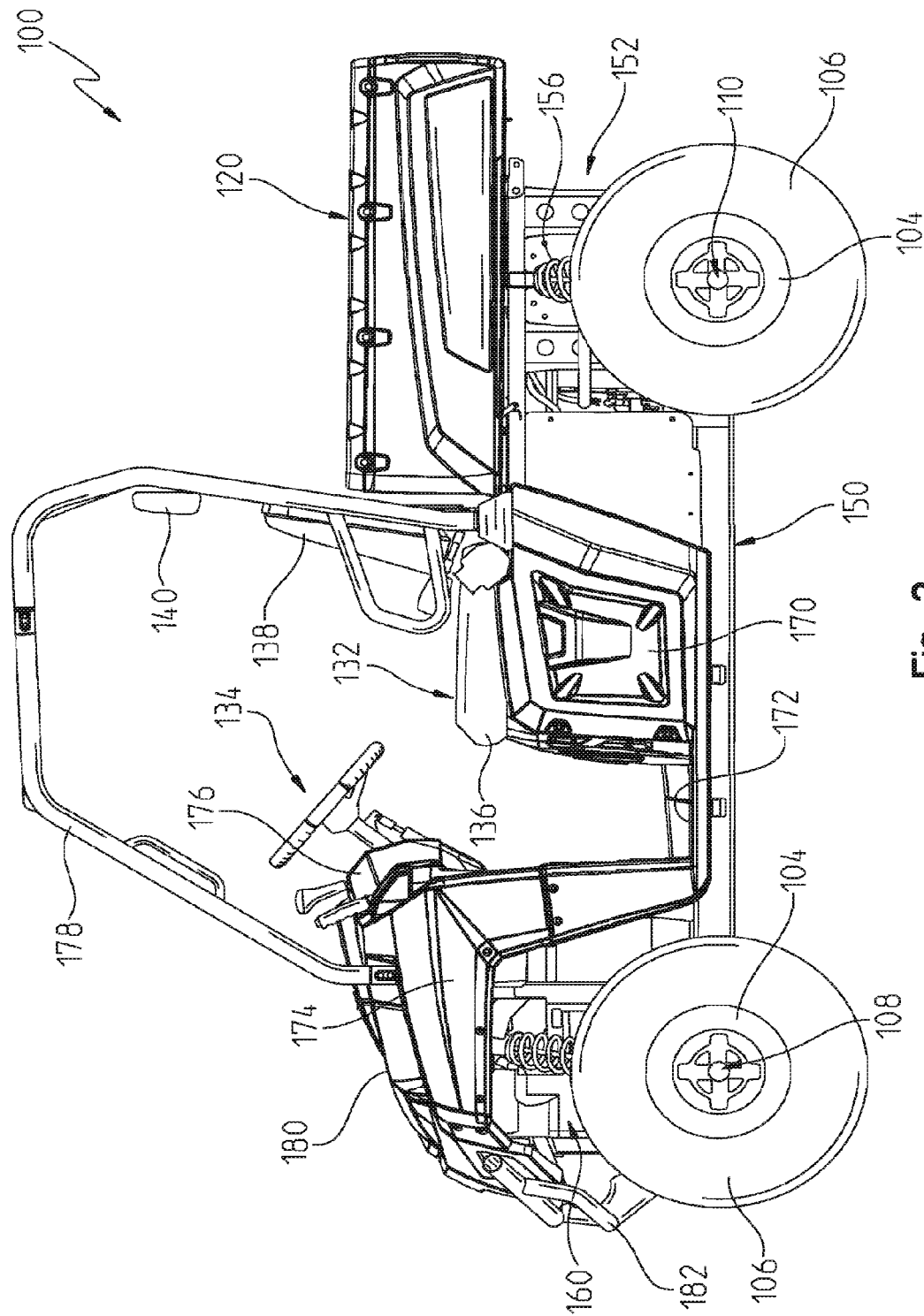
FIG. 2 illustrates a left side view of the exemplary utility vehicle of FIG. 1.

Vehicle 100 includes an operator area 130 including seating 132 for one or more passengers. Operator area 130 further includes a plurality of operator controls 134 by which an operator may provide input into the control of vehicle 100. Controls 134 may include controls for steering, acceleration and braking As shown in FIGS. 2 and 3, seating 132 includes a seat bottom portion 136 and a seat back portion 138 and head rests 140. Seating 132 is shown in the present embodiment as a split bench with the operator side being adjustable along the longitudinal axis of vehicle 100. As illustrated herein, the operator area 130 includes a single bench seat 132, but it should be appreciated that multiple tandem seats could be incorporated.

Vehicle 100 includes four wheel independent suspensions. Referring to FIG. 1, each ground engaging member 102 of rear axle 110 is coupled to frame 150 (FIG. 2) through a rear suspension 152. Rear suspension 152 includes double A-arms 154 and a shock 156 (FIG. 2). Each ground engaging member 102 of front axle 108 is coupled to frame 150 through a front suspension 160. Front suspension 160 includes double A-arms 162 and a shock 164 (FIG. 1).

Figure 4:
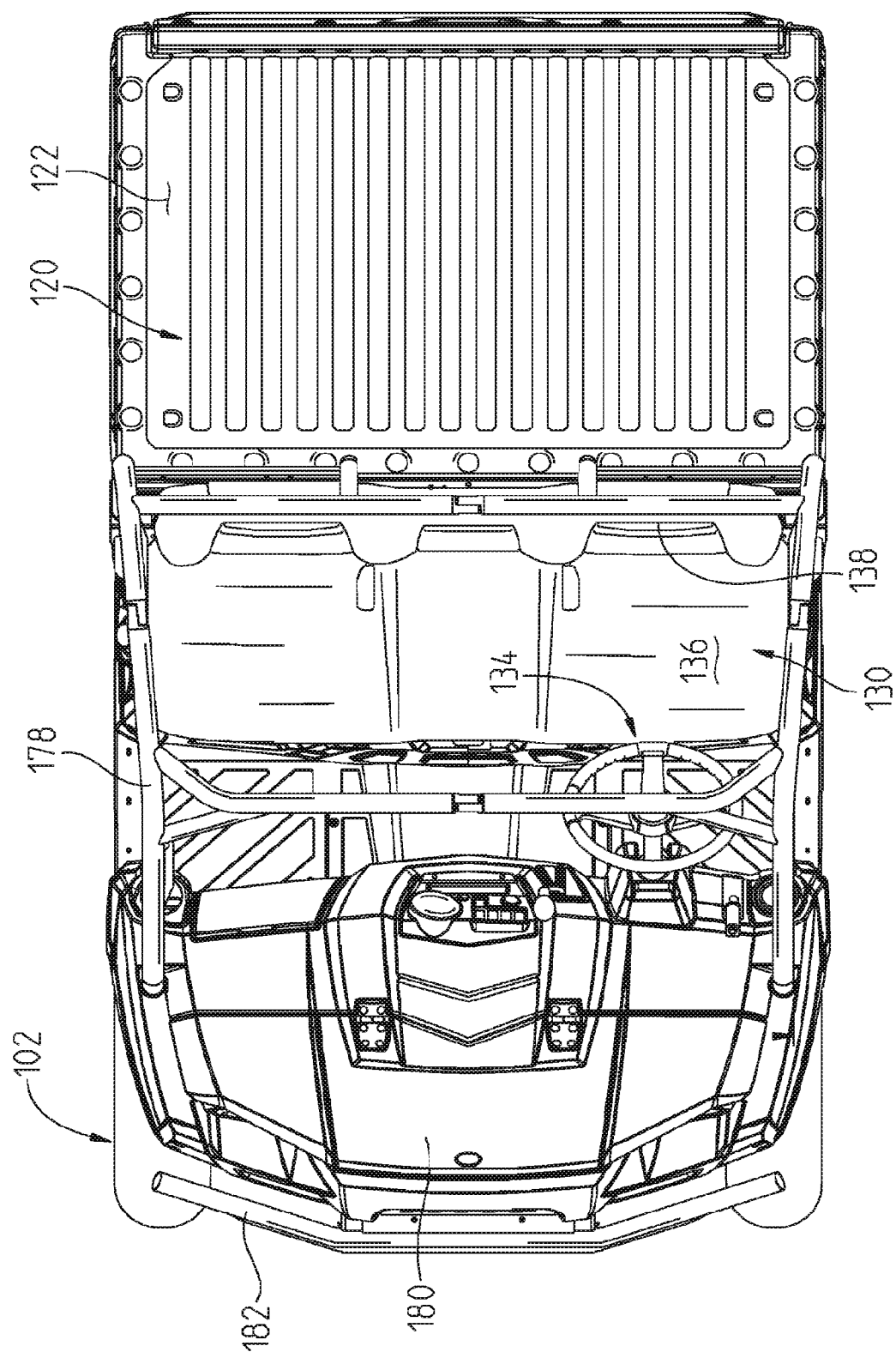
FIG. 4 illustrates a top view of the exemplary utility vehicle of FIG. 1.

In addition to the bed 120, utility vehicle 100 includes a plurality of body components, and as best shown in FIGS. 2-4, namely side panels 170, floor boards 172, wheel wells 174, dash 176, rollover structure 178, hood 180, and bumper 182. All of these items are directly or indirectly attached to and/or supported by the vehicle frame 150.

Figure 5:
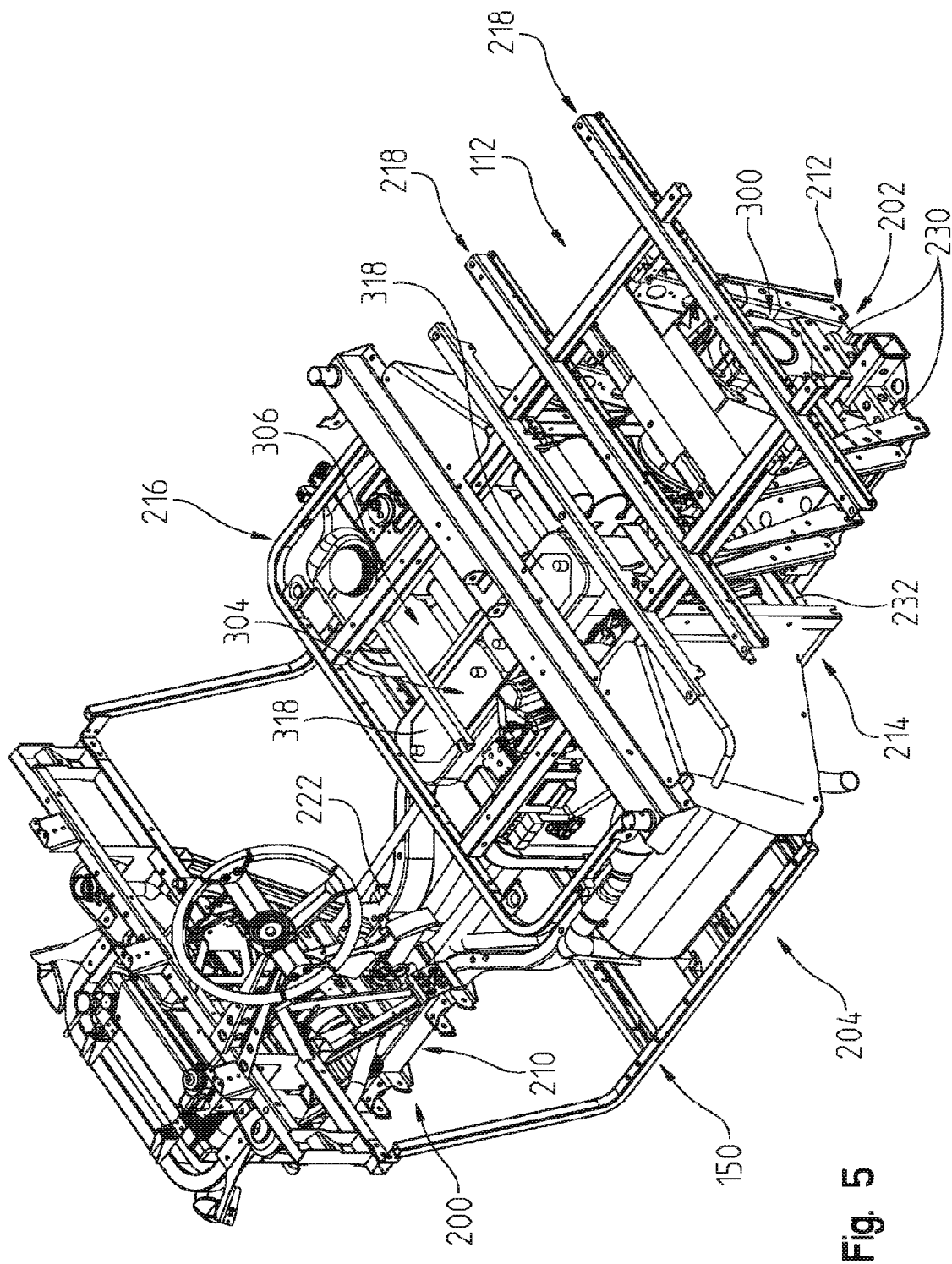
FIG. 5 illustrates a left rear perspective view of the exemplary utility vehicle of FIG. 1, with the body panels and roll-over structure removed.
Figure 6:
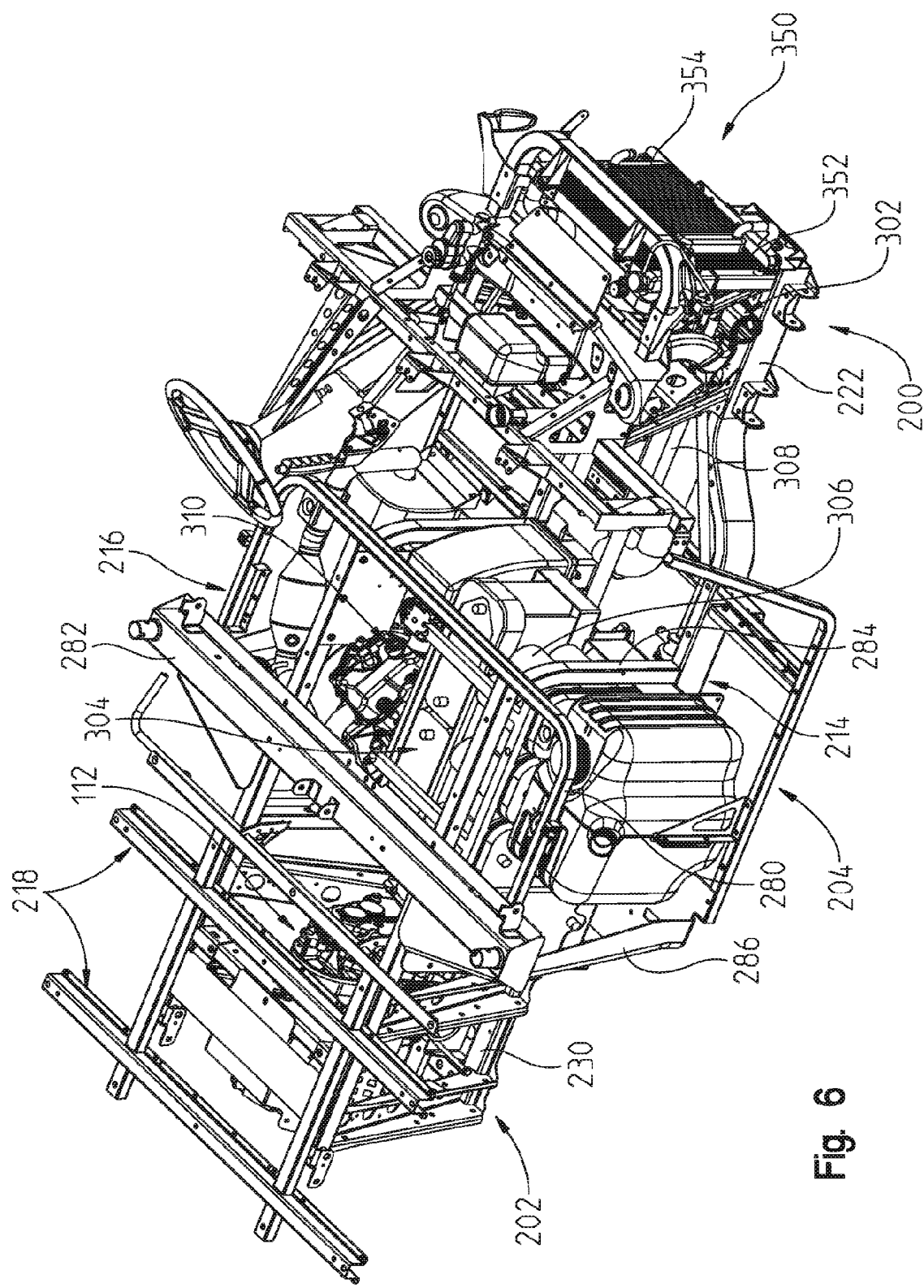
FIG. 6 illustrates a right front perspective view of the vehicle illustrated in FIG. 5.
Figure 7:
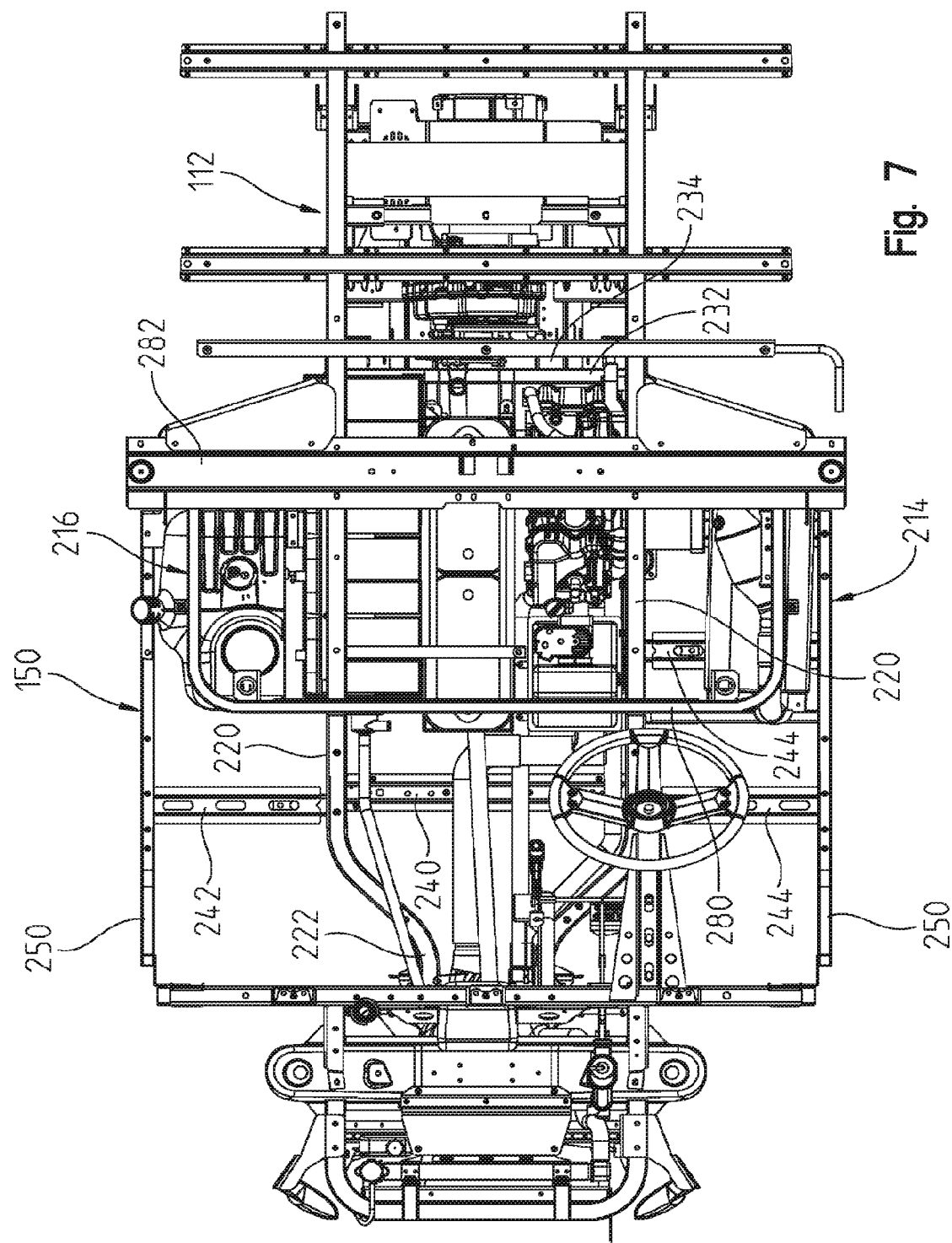
FIG. 7 illustrates a top view of the utility vehicle as depicted in FIG. 5.

With reference now to FIGS. 5-7, vehicle 100 is shown with the body accessory parts and rollover structure 178 removed showing basically the frame 150 and drivetrain 112. As shown best in FIGS. 5 and 6, the vehicle has a front end 200, a rear end 202 and an intermediate portion 204 between the front and rear portion 200, 202. Frame 150 includes corresponding front frame portion 210, rear frame portion 212 and intermediate frame portion 214. The frame portions 210, 212, 214 provide support to drivetrain 112 as further described herein. In addition, frame 150 includes a seat support portion 216 and a bed support portion 218.

Figure 8:
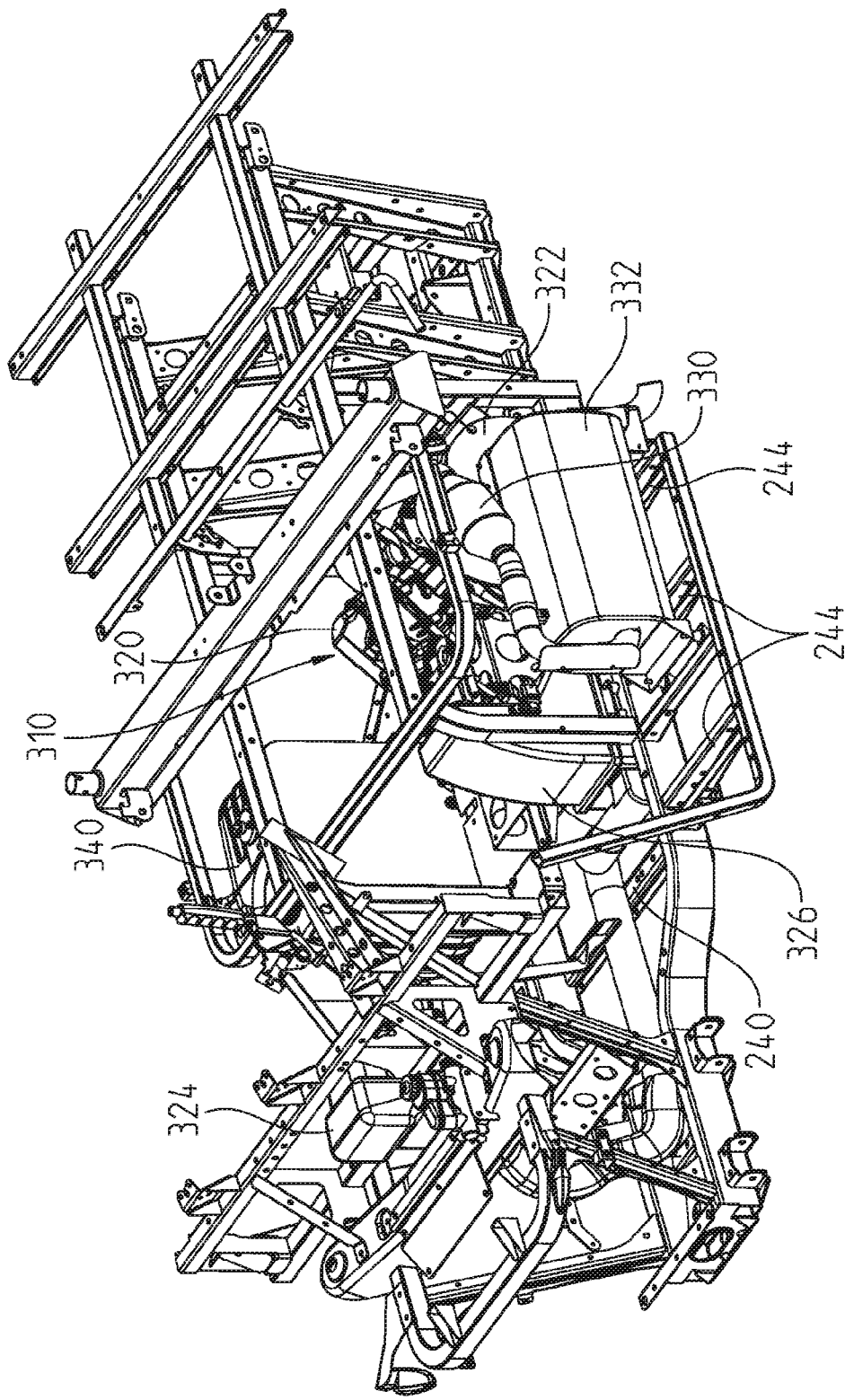
FIG. 8 illustrates the range extender generator of the vehicle positioned in the frame.
Figure 9:
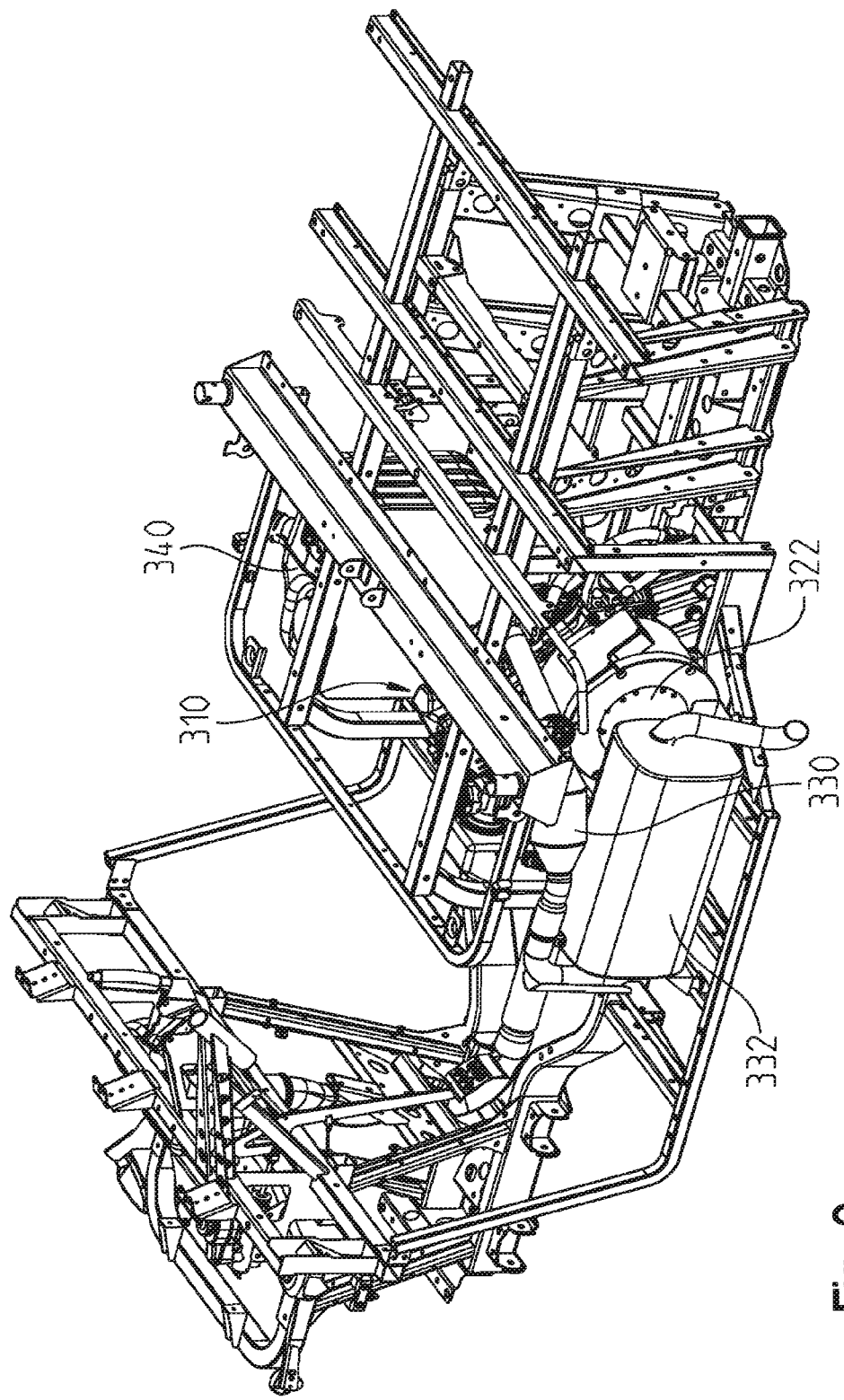
FIG. 9 illustrates a rear perspective view of the vehicle rear end shown in FIG. 8.
Figure 10:
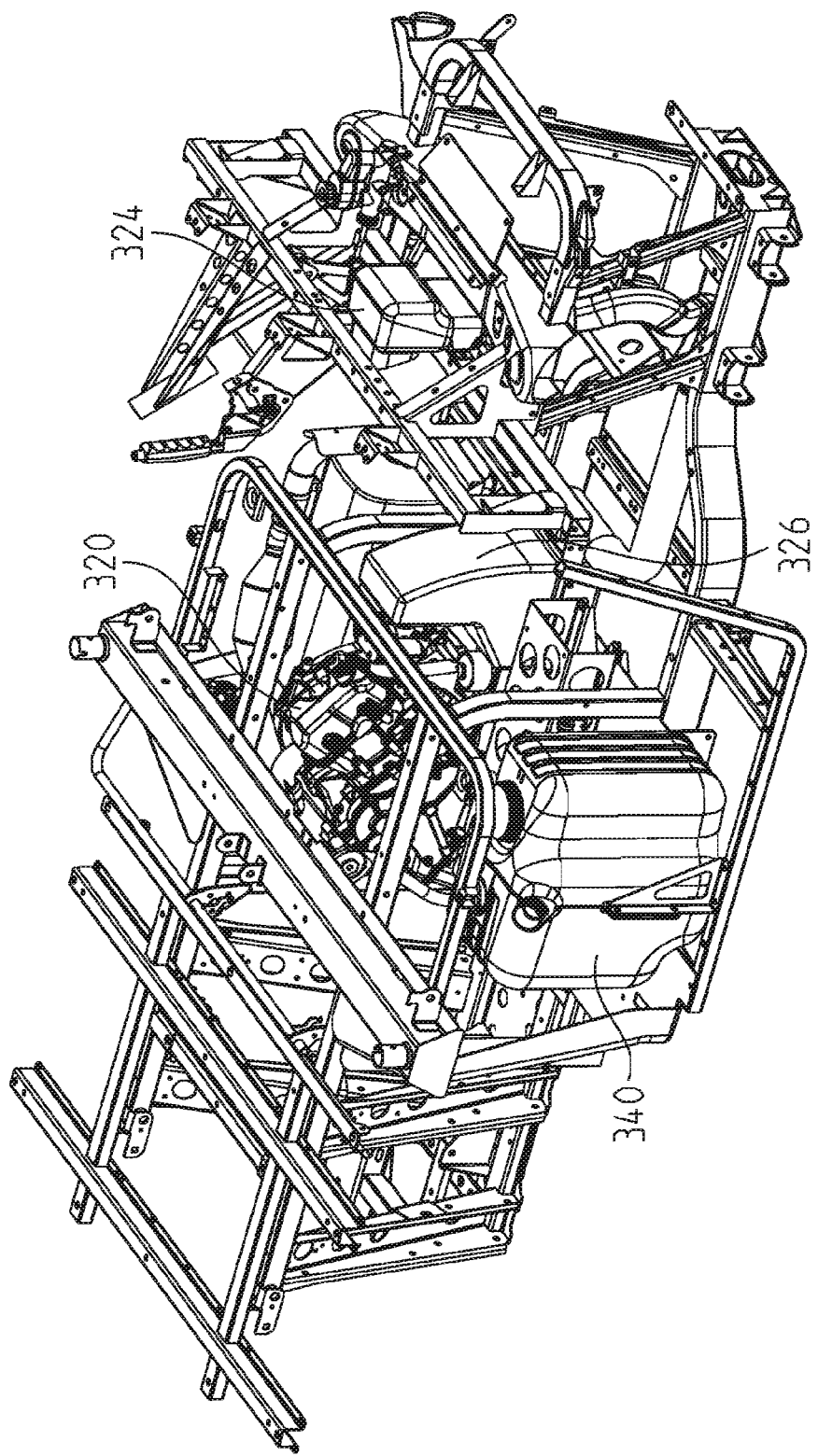
FIG. 10 illustrates a front right perspective view of the vehicle of FIGS. 8.

With respect to FIG. 7, frame 150 will be described. Frame 150 includes longitudinally extending frame members 220 which extend a substantial length of the vehicle and neck down in the front to form front frame members at 222. As shown best in FIGS. 5 and 6, rear frame portion 212 is defined by channel members 230 extending from a transverse portion 232 which, in turn, extends between longitudinally extending frame members 220. Plate portion 234 (FIG. 7) extends across channel members 230 to provide support for a rear portion of the drivetrain 112, as described herein. As best shown in FIGS. 7 and 8, intermediate frame portion 214 is comprised of transverse channels 240 extending between longitudinally extending frame members 220 and transverse channel portions 242, 244 extending outwardly from longitudinally extending frame members 220. Outer rails 250 extend from channel portions 242, 244.

With respect again to FIG. 7, seat support platform 216 is comprised of crossbars 280, 282 which are elevated from the longitudinal extending support members 220 by way of vertical support members 284 and 286 (FIG. 6). As shown, cross bar 280 defines a front end of the seat supporting portion.

With reference now to FIGS. 5-7, drivetrain 112 is generally comprised of rear drive 300 (FIG. 5), front drive 302 (FIG. 6), battery packs 304, 306; a prop shaft 308 interconnecting the rear and front drives 300, 302 (FIG. 6); and a controller to control the motor speed and other electrical functions as described herein. An on-board charger or range extender 310 is also provided to recharge the batteries when the battery charge is low. Range extender 310 also operates to provide power to motor 500, as described herein. As also shown, battery packs 304, 306 comprise individual batteries 318 (FIG. 5). Battery pack 304 has batteries 318 positioned in a longitudinally tandem relationship, and the charger 310 is positioned next to the battery 318. Charger 310 is an engine driven generator, or range extender, which is described in greater detail in one or more of our applications, U.S. patent application Ser. Nos. 12/737,149; 12/928,479; 12/928,484; 12/928,498; 12/928,493; 12/928,495; and 12/928,482, the disclosures of which are expressly incorporated herein by reference. Meanwhile, batteries 318 of battery pack 306 stand on their ends, as further described herein. Alternatively, batteries 318 may be configured in other arrangements to accommodate particular vehicles with particular sizes, weights, and applications. In the illustrated embodiment, batteries 318 of battery packs 304, 306 are connected together in series to operate as a single entity. In one embodiment, batteries 318 are absorbed glass mat (AGM) lead acid batteries 318 having a capacity of about 5.54 kWh. Alternatively, batteries 318 may have a capacity of approximately 12.5 kWh. Lead-acid battery packs may be used because it may not be necessary to provide heating and/or cooling systems. Additionally, lead-acid batteries may be less expensive than other battery types. In one embodiment, batteries 318 are lithium ion-type batteries. Exemplary batteries 318 include Model No. YT S 5,5 available from OPTIMA Batteries. Other suitable batteries 318 may be used.

With reference now to FIGS. 8-16, the charging assembly will be described in greater detail. As illustrated first in FIGS. 8-11, charging assembly is generally comprised of an engine and generator unit 310 comprised of an engine 320, generator 322, air intake system including an intake 324 and an air box 326, an exhaust system comprised of a catalytic converter 330 and muffler 332, a fuel system comprising fuel tank 340, and a cooling system 350 (FIG. 6) having first 352 and second 354 heat exchangers or radiators. With reference to FIGS. 12A-16, the intake and exhaust system of the charging assembly 310 will be described in greater detail.

Figure 12A:
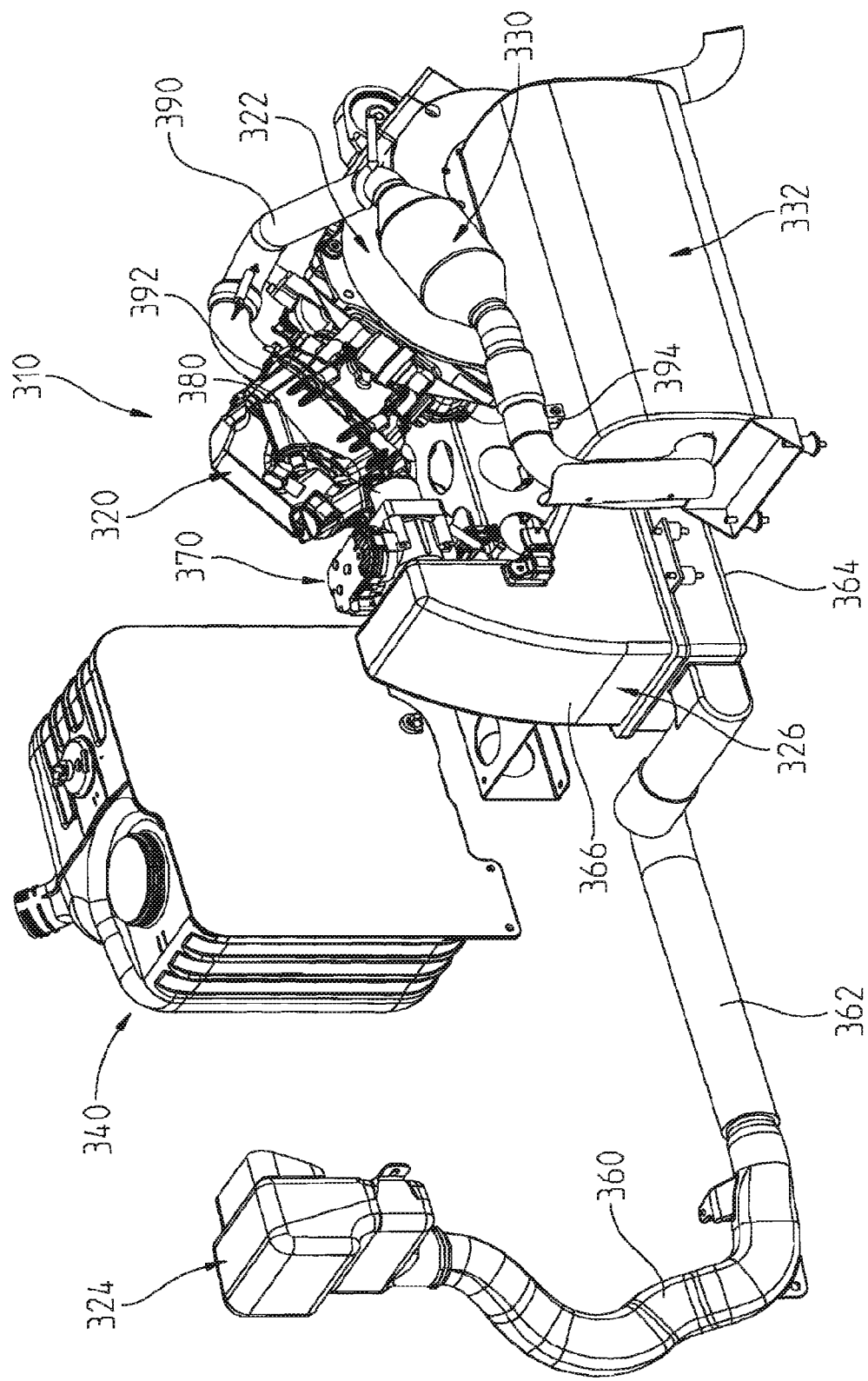
FIG. 12A illustrates a front left perspective view of the range extender intake and exhaust system of the utility vehicle of FIG. 8 removed from the frame.

With reference first to FIG. 12A, air is drawn into the engine through air input 324 and through duct work 360, 362 to a lower portion 364 of air box 326. Air box 326 also includes an upper air box portion 366 which is held in place to lower portion 364 to encapsulate therein an air filter (not shown). Air is discharged through upper portion 366 into a throttle body 370 and into intake port 380 of engine 320.

On the exhaust side, exhaust pipes 390 are attached to exhaust port 392 of engine 320 which communicate with catalytic converter 330 which in turn are connected by way of exhaust pipes 394 to muffler 332.

Figure 12B:
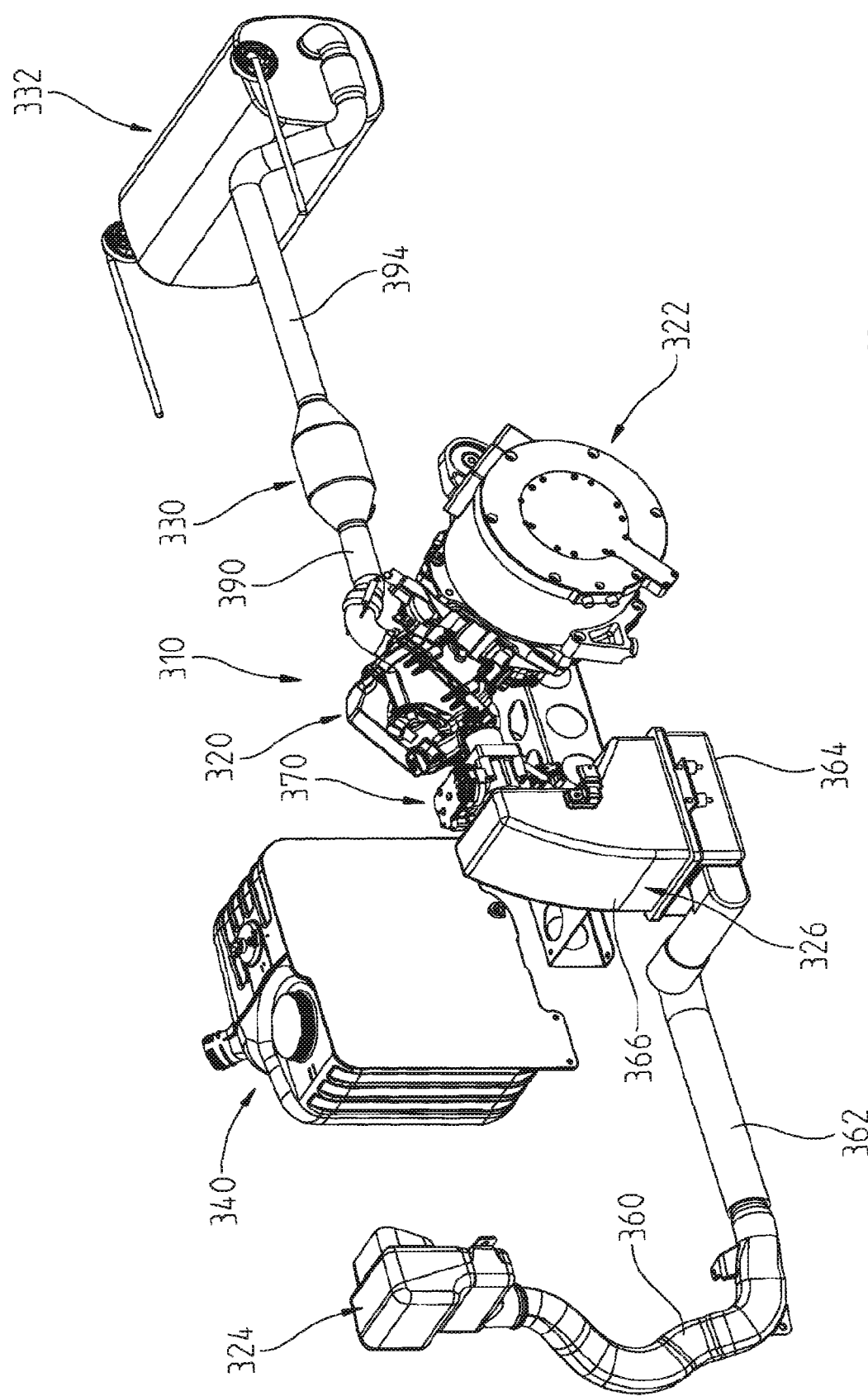
FIG. 12B illustrates a front left perspective view of the range extender intake and exhaust system with the muffler positioned behind the range extender.
Figure 13:
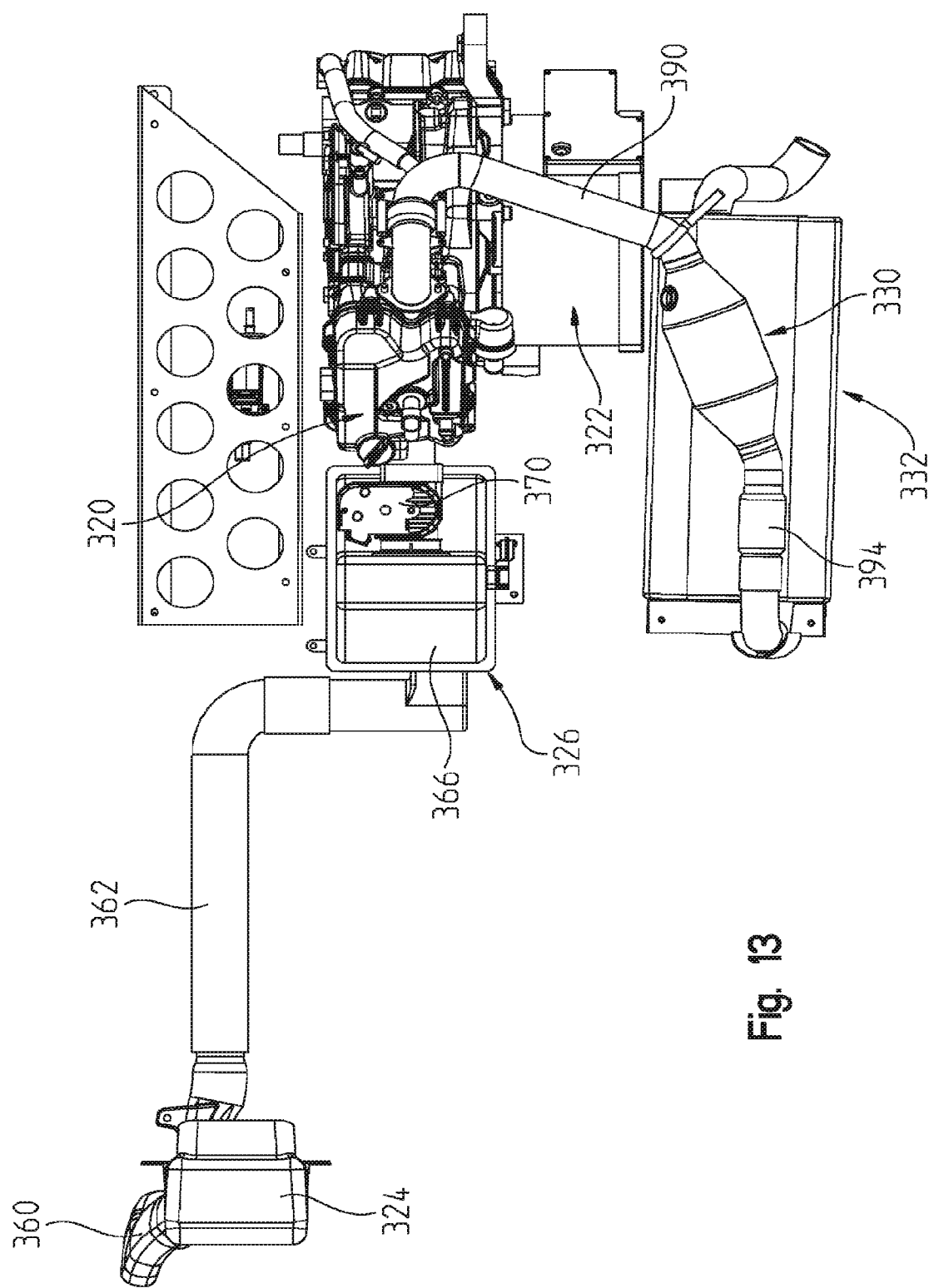
FIG. 13 illustrates a top view of the range extender as depicted in FIG. 12A.
Figure 14:
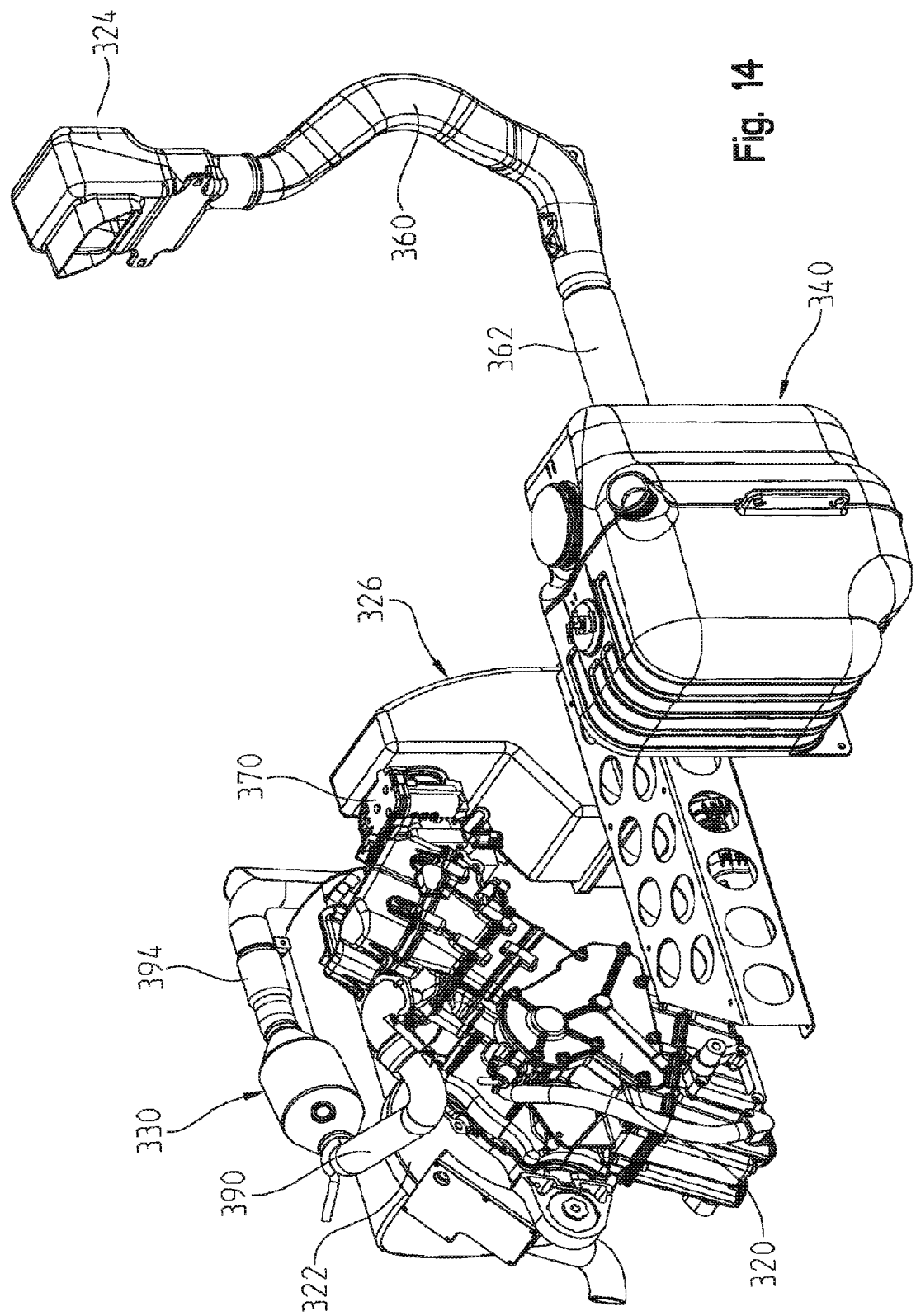
FIG. 14 shows a right perspective view of the range extender as depicted in FIG. 12A.
Figure 21A:
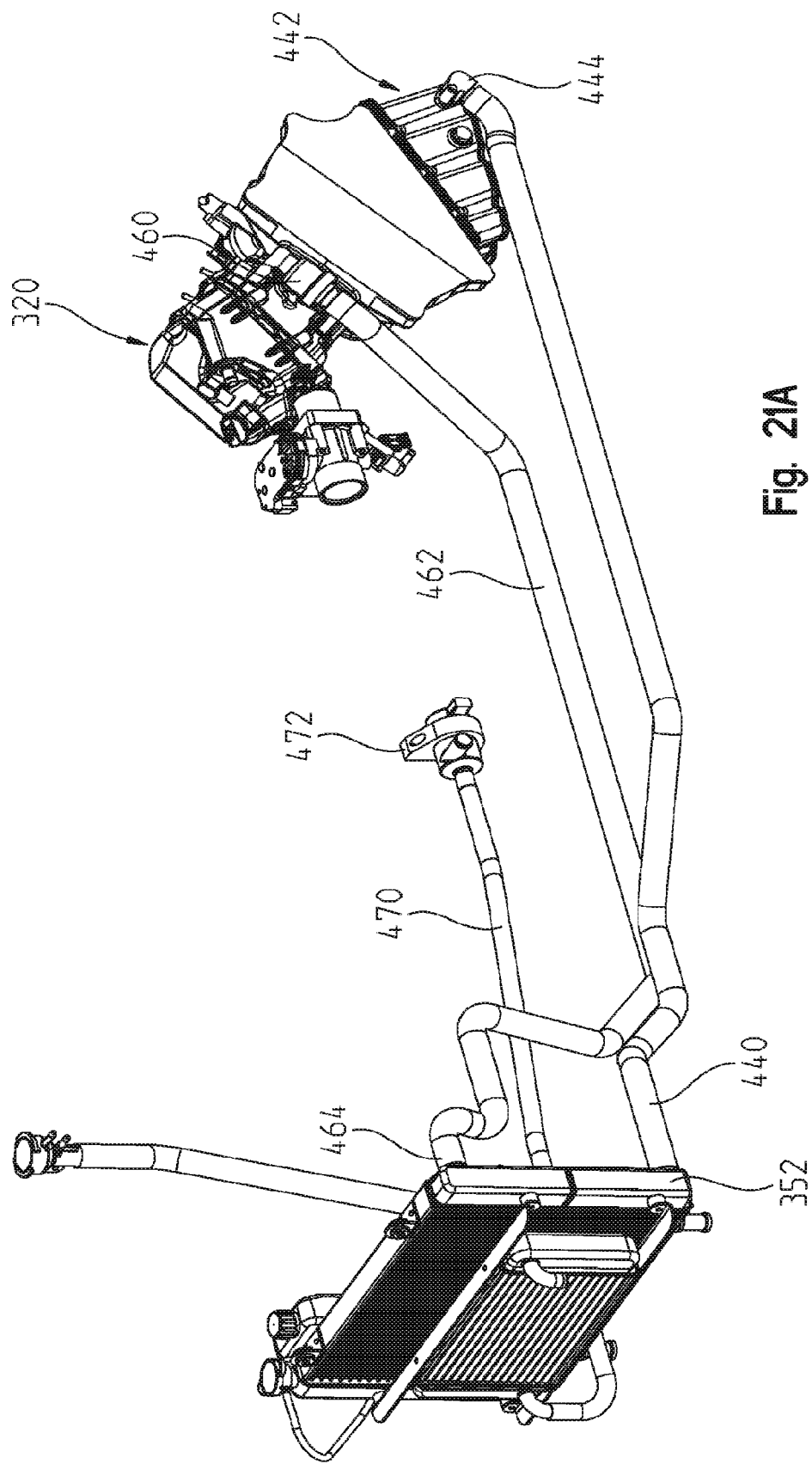
FIG. 21A illustrates a front left perspective view of the cooling system of FIG. 19.
Figure 21B:
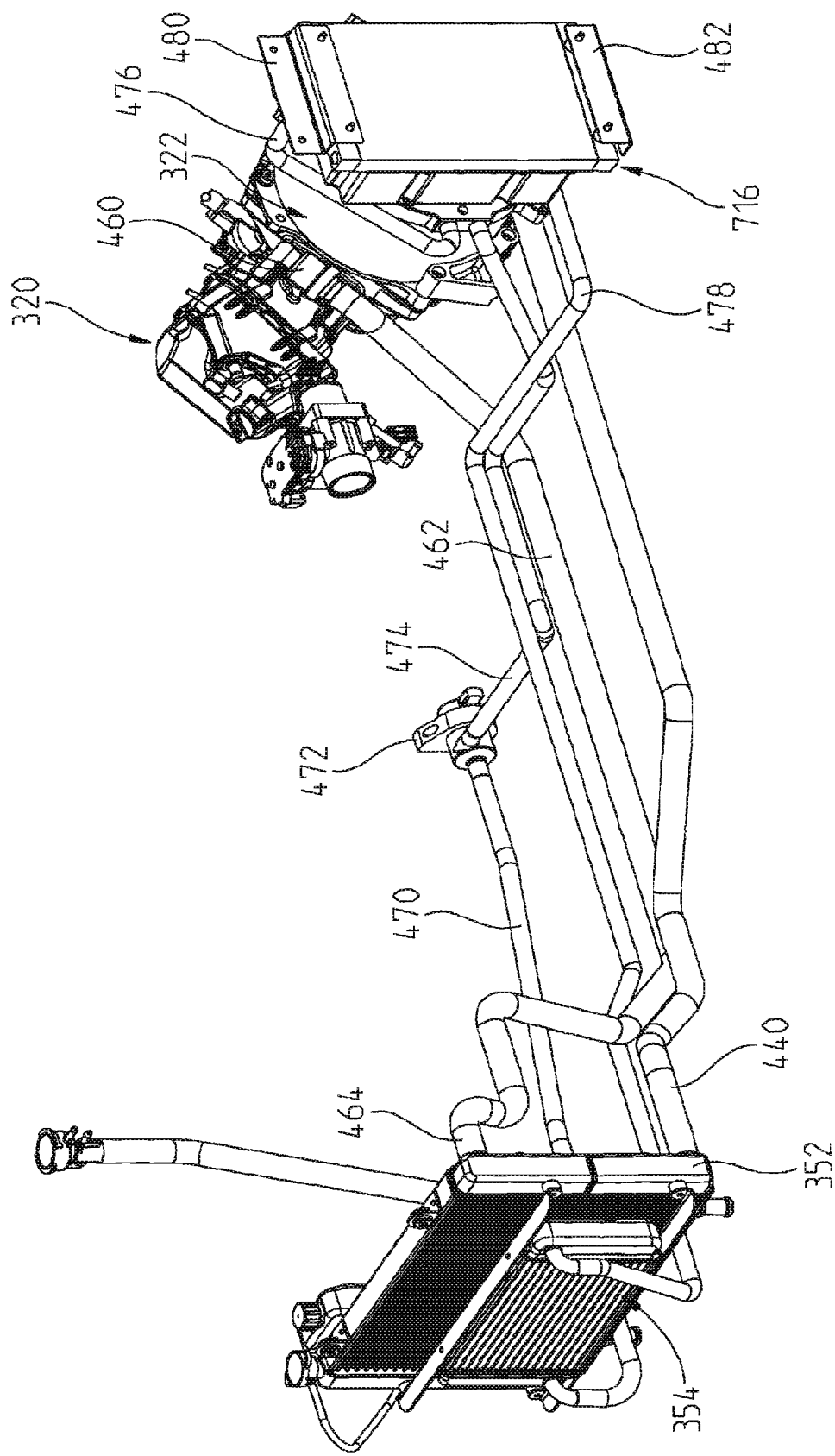
FIG. 21B illustrates a front left perspective view of the cooling system of FIG. 19 routed to the inverter and to the generator.
Figure 21C:
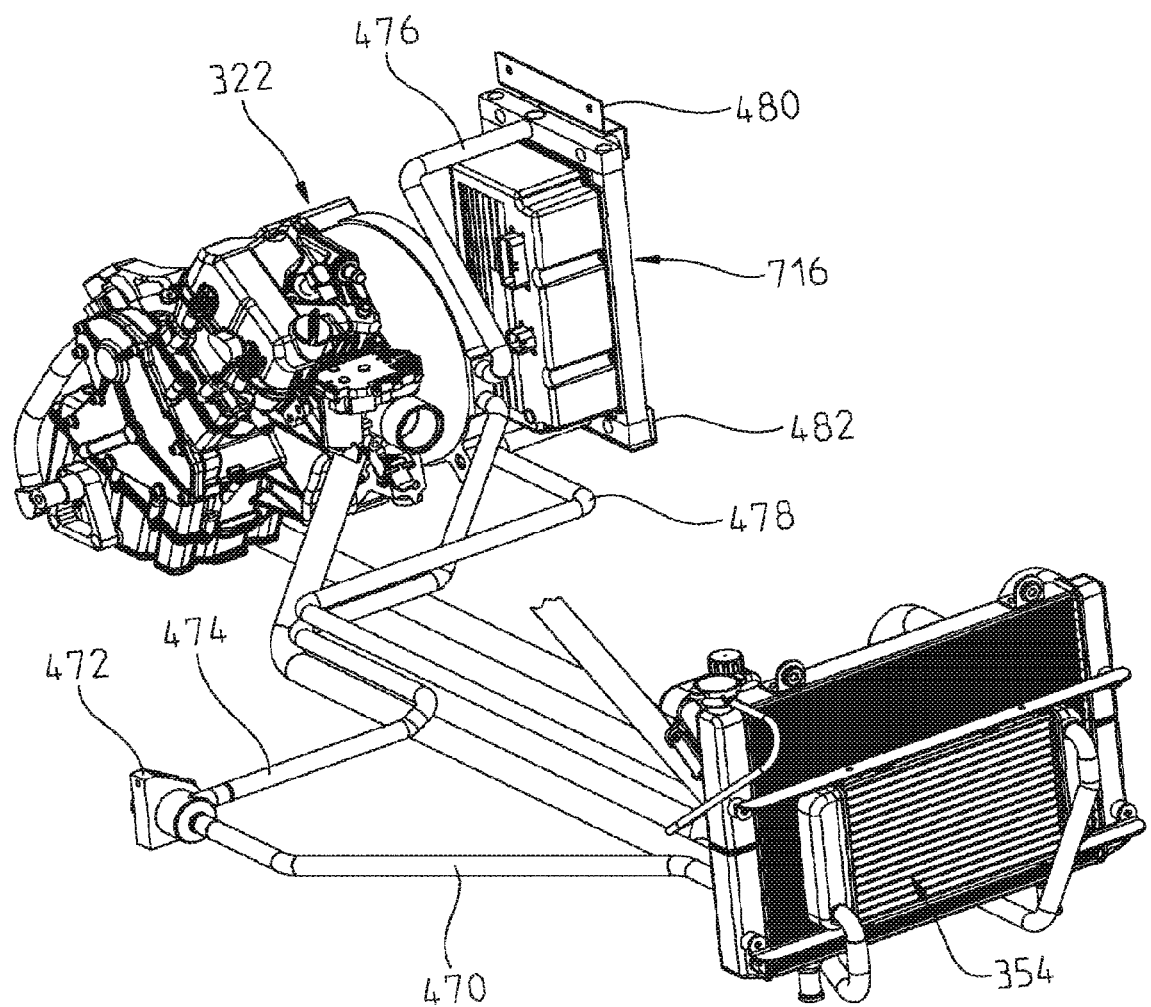
FIG. 21C illustrates a front right perspective view of the cooling system of FIG. 19 routed to the inverter and to the generator.

Muffler 332 is illustratively positioned adjacent generator 322 in FIG. 12A. Referring to FIG. 12B, muffler 332 is shown positioned behind range extender 310. In this embodiment, muffler 332 is mounted below bed support portion 218 (FIG. 6) and behind rear drive 300 (FIG. 5). With muffler 332 positioned towards the rear of vehicle 100, an inverter 716 is positioned adjacent generator 322, as illustrated in FIGS. 21B-21C and described herein.

Figure 15:
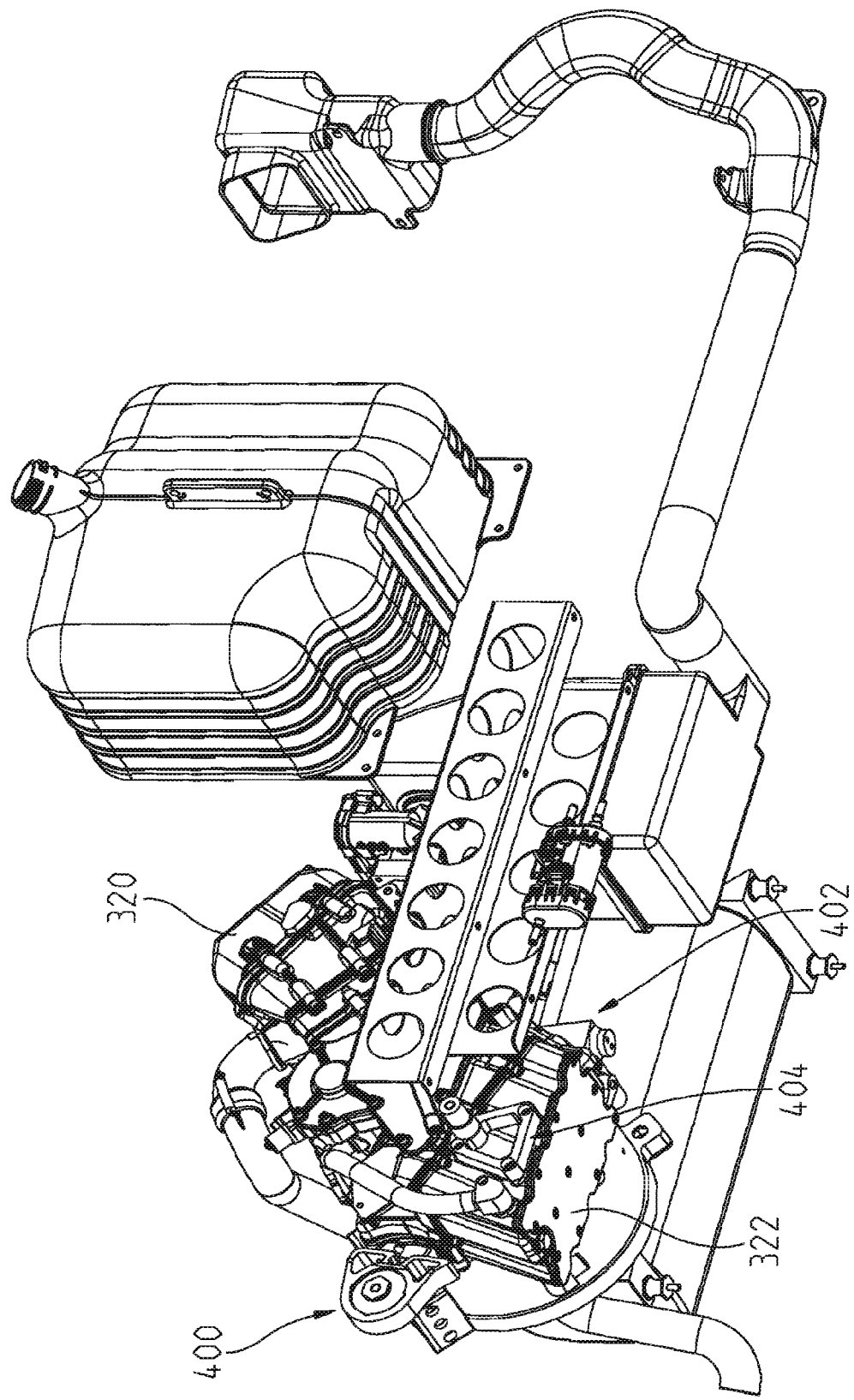
FIG. 15 illustrates an underside perspective view of the range extender as depicted in FIG. 12A.
Figure 16:
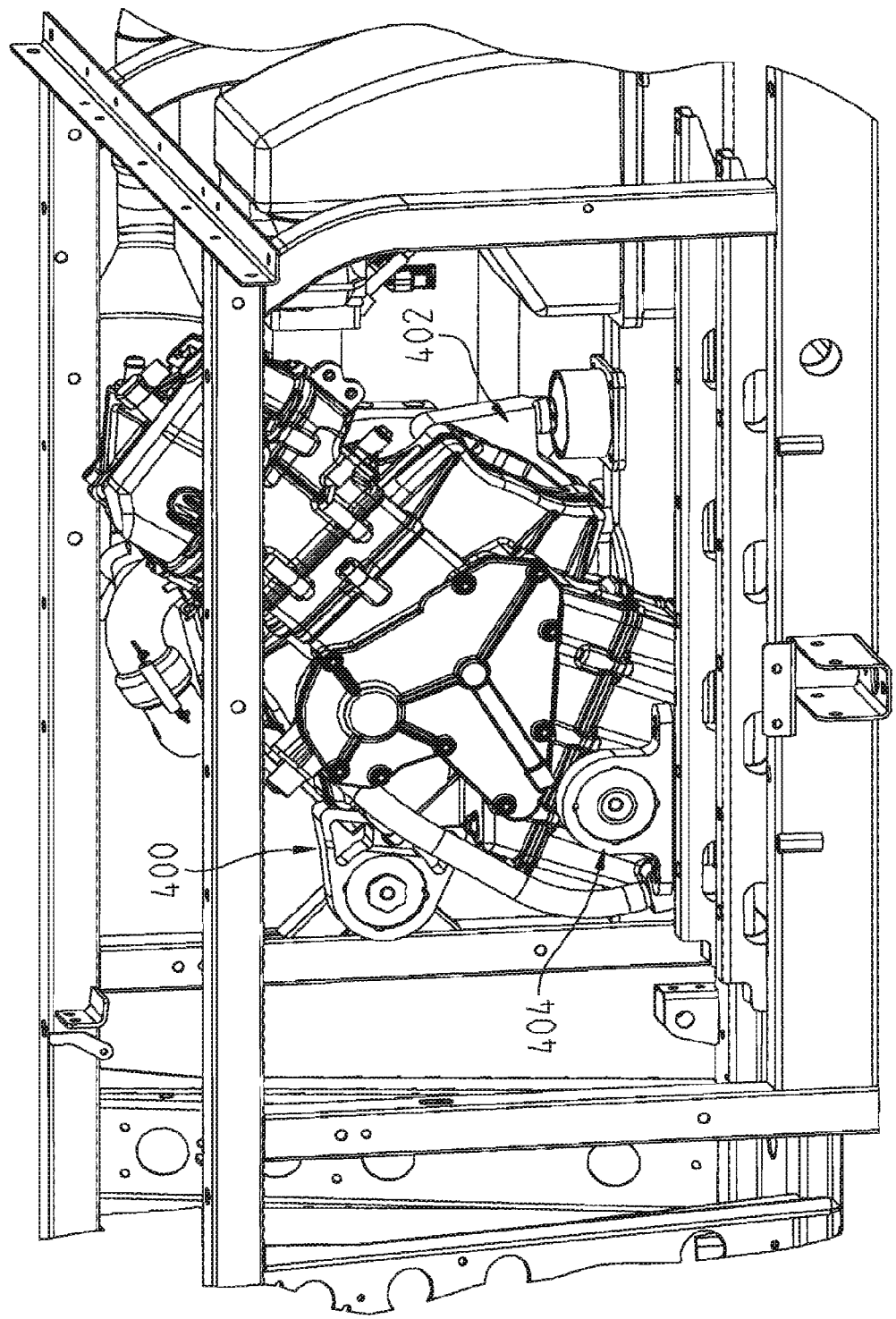
FIG. 16 illustrates an enlarged view of the range extender and air box.
Figure 17:
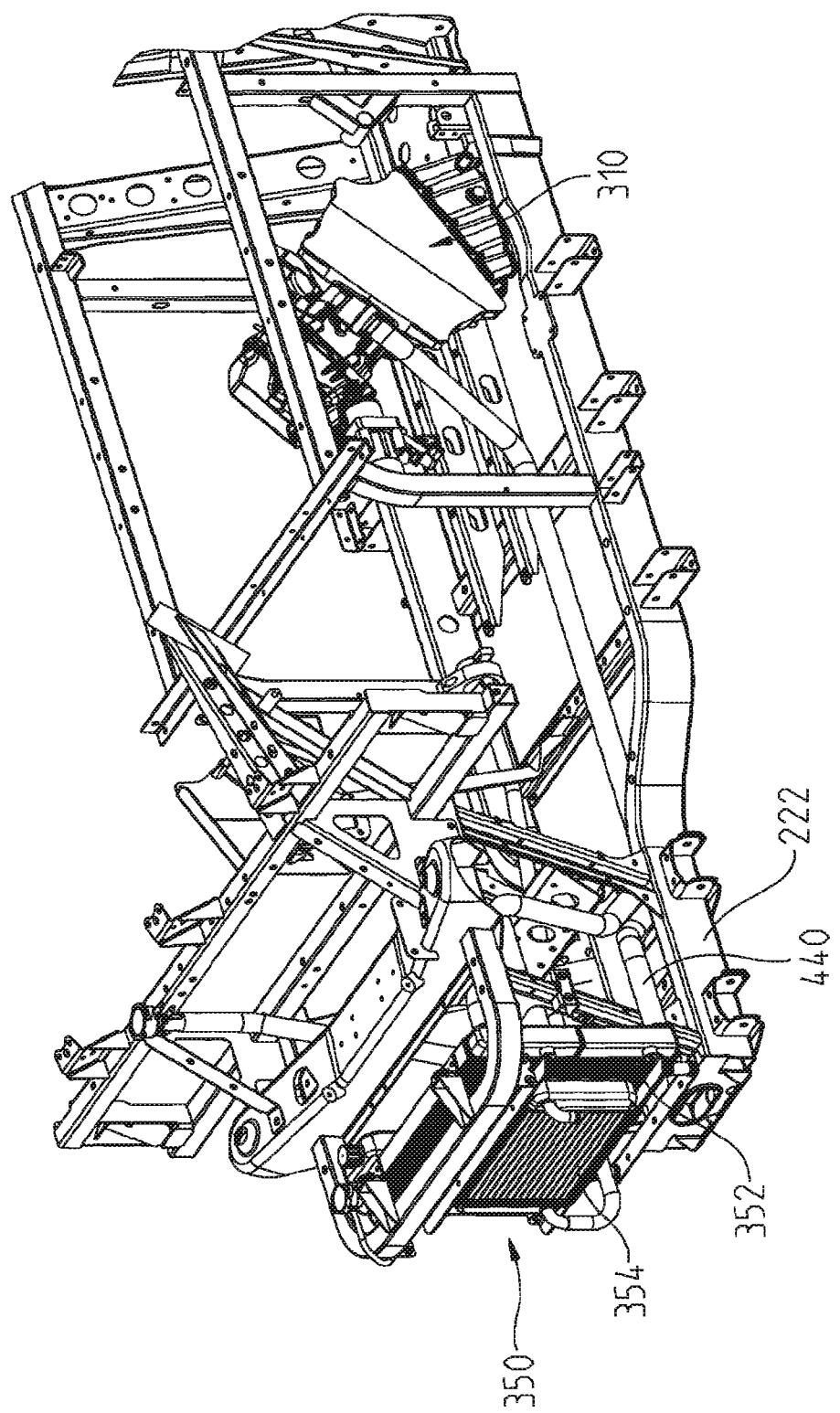
FIG. 17 illustrates the range extender cooling system.
Figure 18:
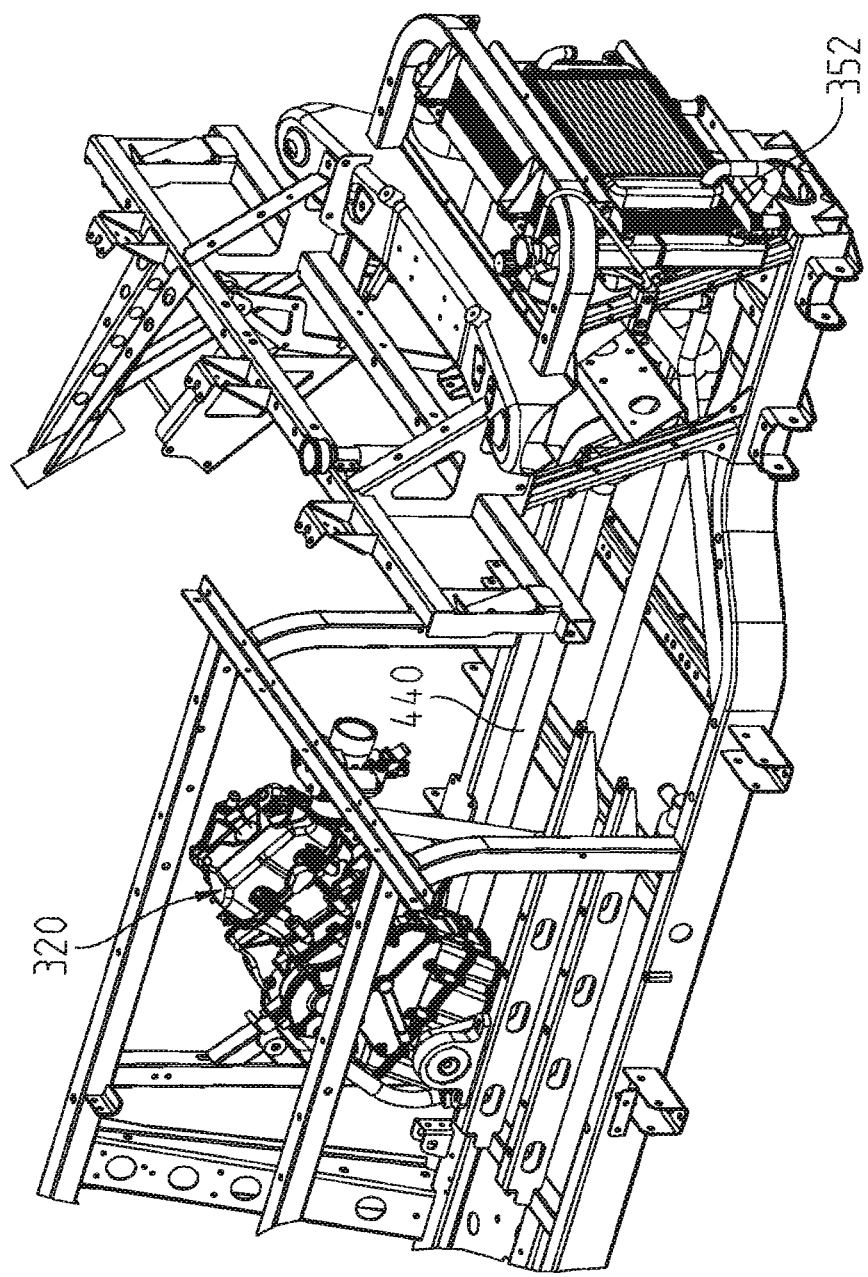
FIG. 18 illustrates a front perspective view of the range extender shown in FIG. 17.
Figure 19:
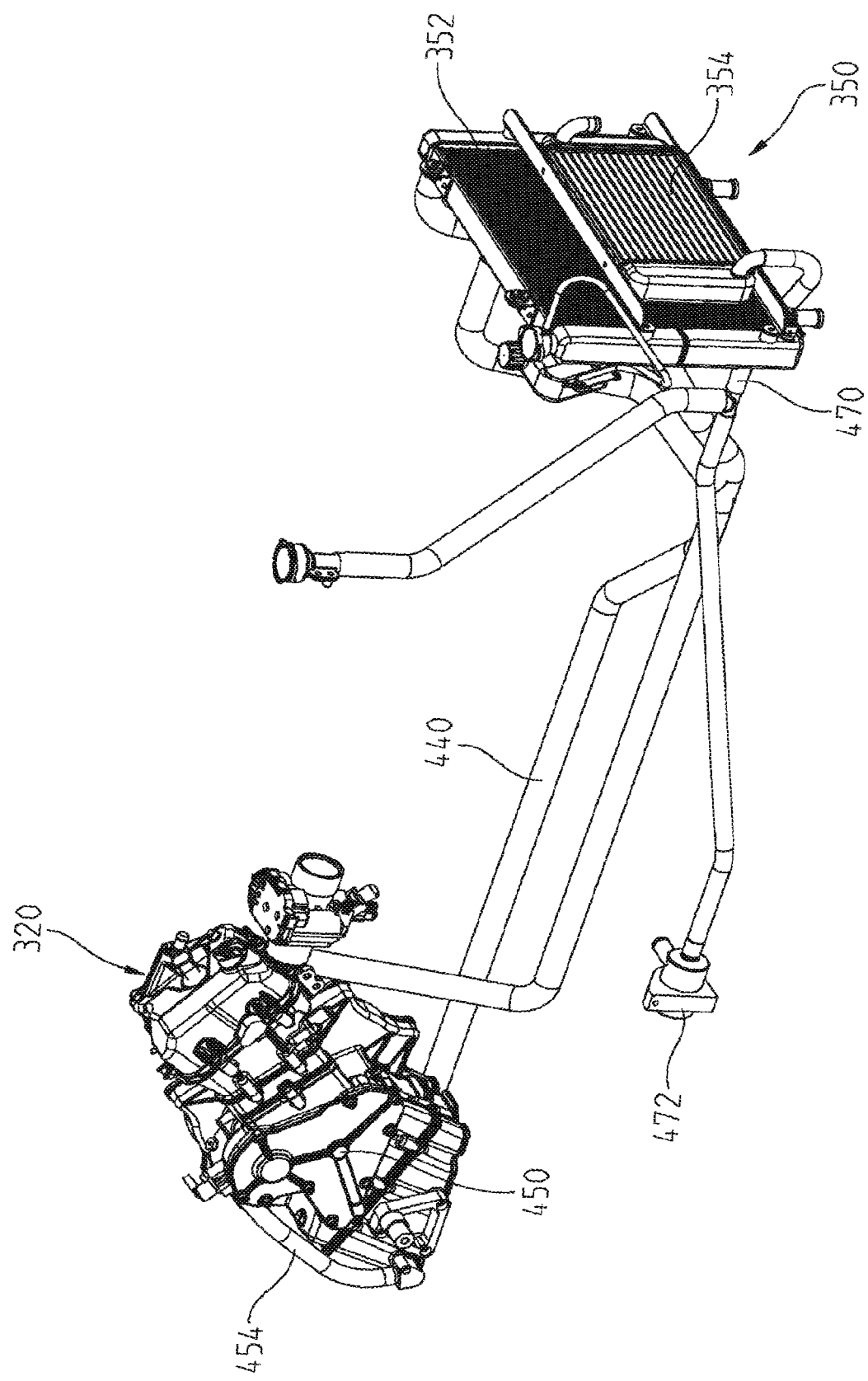
FIG. 19 illustrates the cooling system removed from the frame.

With reference to FIGS. 15 and 16, engine 320 and generator 322 are shown mounted via mounts 400, 402, and 404.

With reference now to FIGS. 17-21C, cooling system 350 will be described in greater detail. As illustrated, radiator 352 has a cooling water outlet tube at 440 (FIG. 17) which delivers water to an oil heater portion 442 (FIG. 21) through inlet 444. As mentioned above, engine 320 is described in U.S. patent application Ser. Nos. 12/737,149; 12/928,479; 12/928,484; 12/928,498; 12/928,493; 12/928,495; and 12/928,482.

Water is drawn up into engine 320 by way of a water pump 450 (FIG. 20) through outlet 452 of oil heater 442, through water tubing 454 and into water pump inlet 456. Water is circulated around the internal portion of the head of engine 320 and is discharged through outlet 460 (FIG. 21A) through outlet tubing 462 and into radiator inlet 464. Thus, while water circulating through radiator 352 cools engine 320, it also warms the oil by way of oil heater 442 in order that the engine 320 is in a run ready position when operation of the generator is required.

Referring to FIGS. 21B and 21C, inverter 716 is illustratively positioned adjacent to generator 322. Brackets 480, 482 are provided for mounting inverter 716 to frame 150 (FIG. 5) of vehicle 100. Radiator 354 cools the electrical equipment by way of circulation through tubing 470 and through pump 472. Water pump 472 pumps water from radiator 354 to generator 322 through water tubing 474. The water moves through generator 322, through water tubing 476, and into inverter 716 before returning to radiator 354 through water tubing 478.

Figure 26:
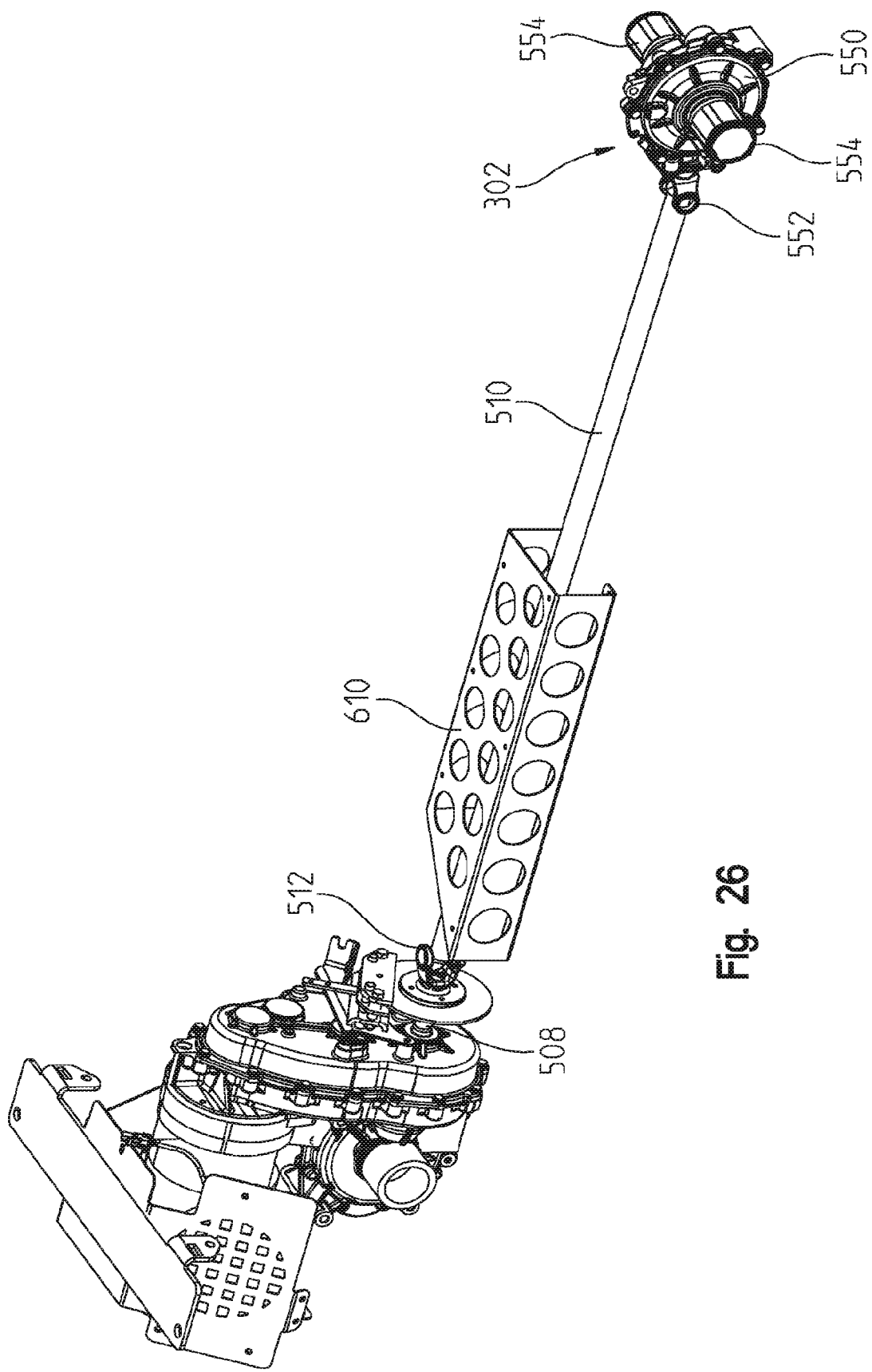
FIG. 26 shows a front right perspective view of the vehicle drivetrain.
Figure 27:
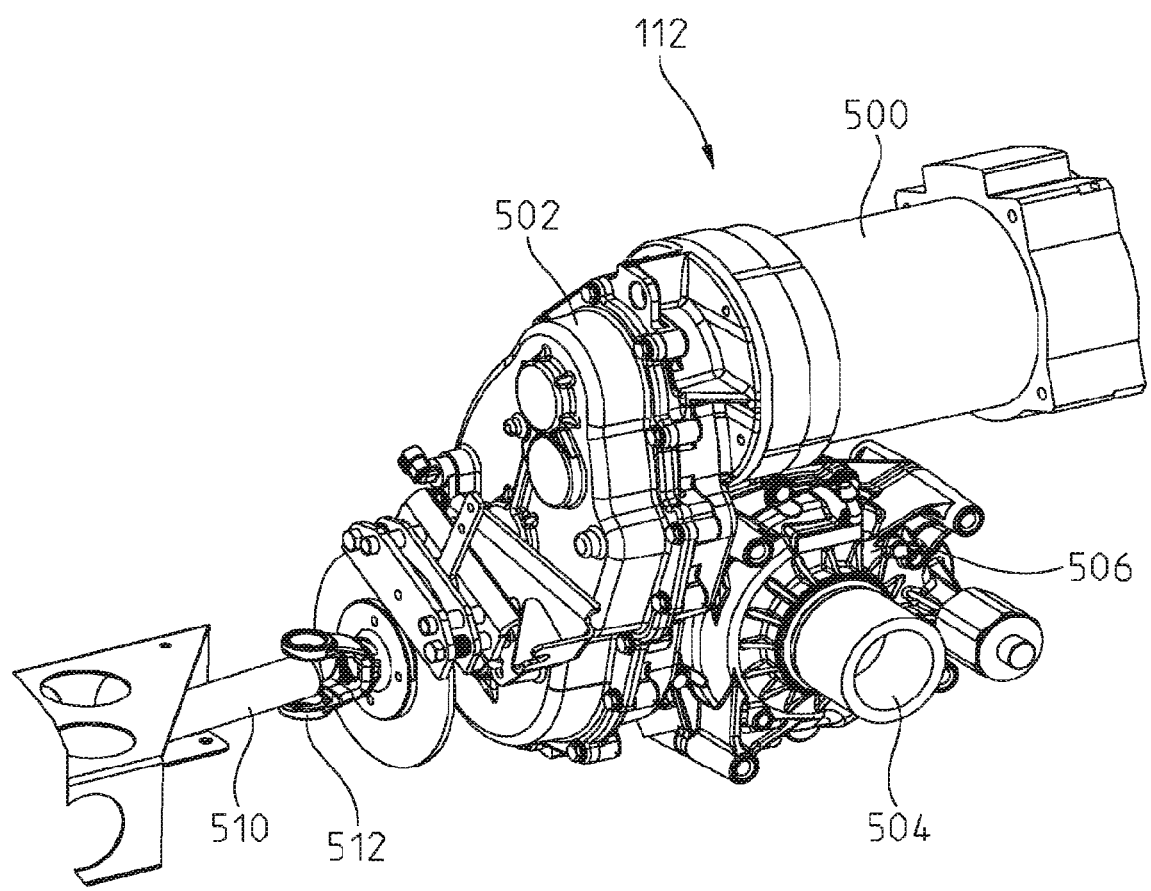
FIG. 27 shows an enlarged view of the rear motor, transaxle and differential.

With reference now to FIGS. 22-27, rear drivetrain 112 is generally comprised of an AC asynchronous motor 500 (or AC induction), a transaxle 502 which in turn drives differential output 504 of differential 506 (FIGS. 25 and 27) and forward drive shaft 508 (FIG. 26) which drives prop shaft 510 through universal joint 512 (FIG. 26). In the embodiment shown, motor 500 may be manufactured by ABM Greiffenberger Antriebstechnik GmbH, of Marktredwitz, Germany model number 112-200-4. Other types of motors may be used, depending on the particular vehicle and vehicle application (e.g., permanent magnet type).

With respect still to FIG. 26, the front drivetrain portion 302 will be described in greater detail. As shown in FIG. 26, front drivetrain portion 302 includes a front differential 550 interconnected to prop shaft 510 by way of a universal joint 552. Differential 550 has two outputs 554 each of which connect to one of the front wheels by way of drive shafts. As shown, differential 550 may be an automatic locking front differential manufactured by Hilliard Corporation of Elmira, N.Y., and may have an overrunning clutch. Differential 550 may also operate under the principle described in U.S. Pat. No. 5,036,939, the subject matter of which is incorporated herein by reference. Another overrunning clutch is shown in U.S. Pat. No. RE38,012, the subject matter of which is incorporated herein by reference.

Figure 28:
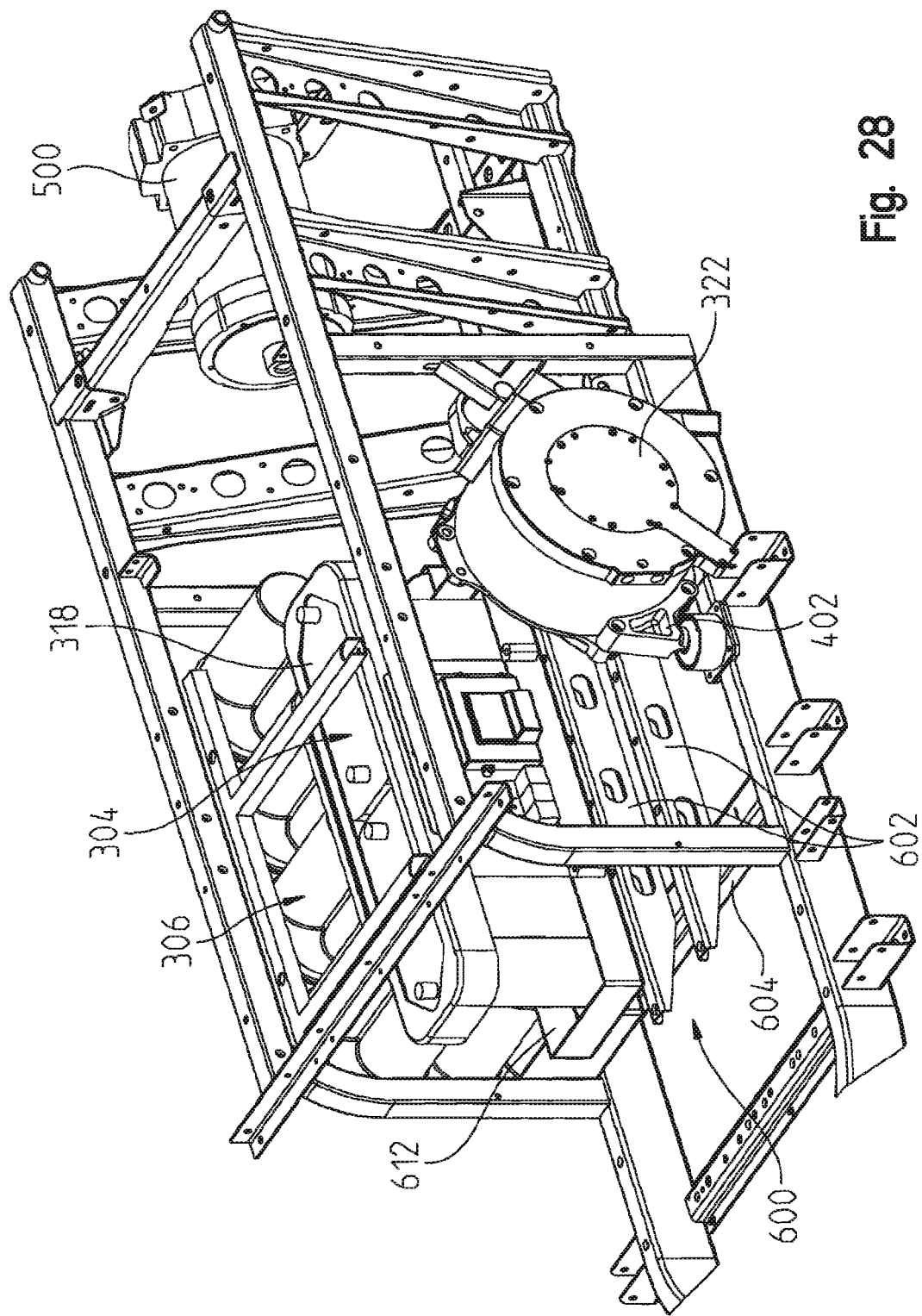
FIG. 28 shows a front left perspective view of the electrical system of the present vehicle.
Figure 29:
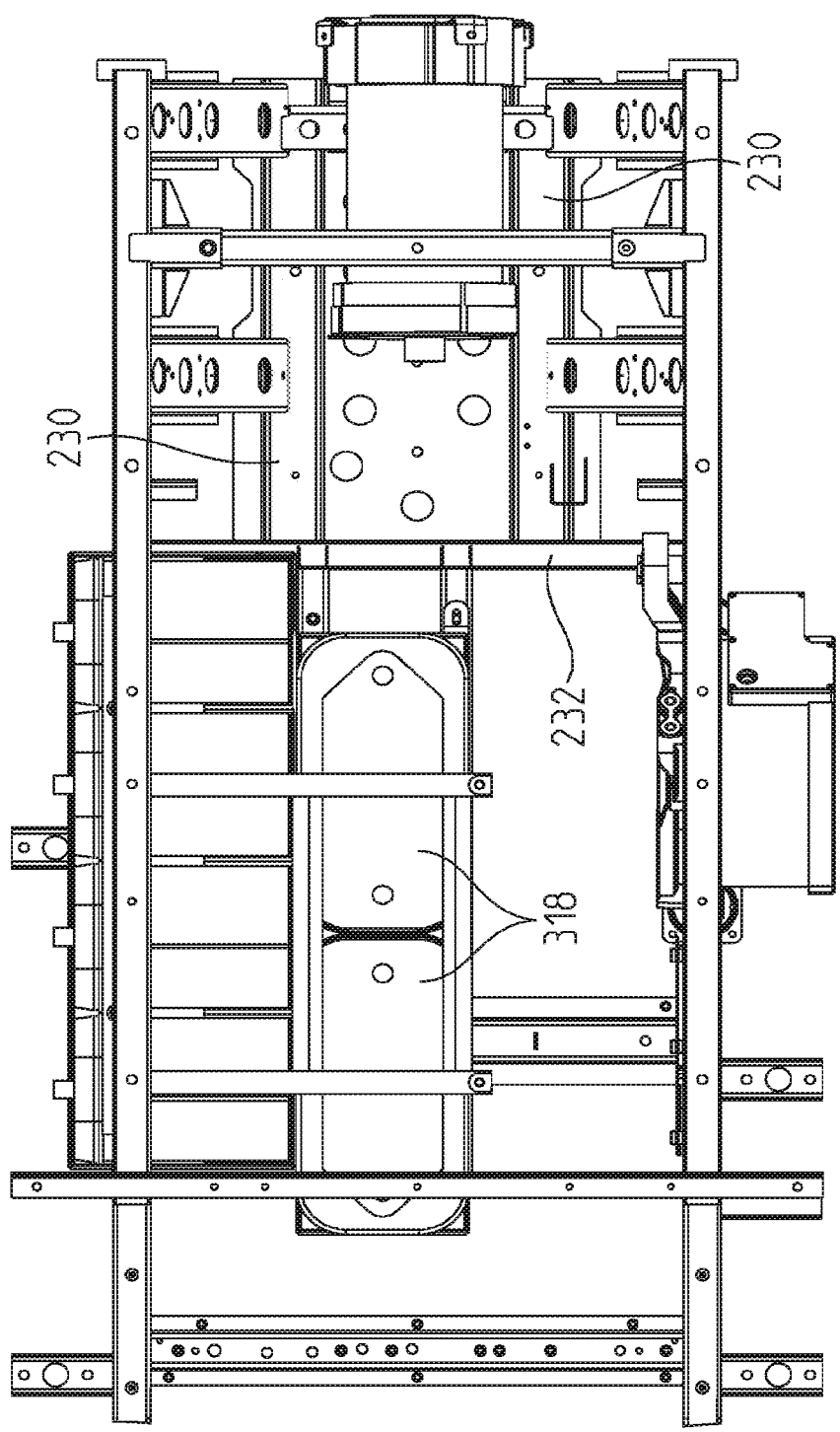
FIG. 29 shows a top view of the vehicle of FIG. 28.
Figure 30:
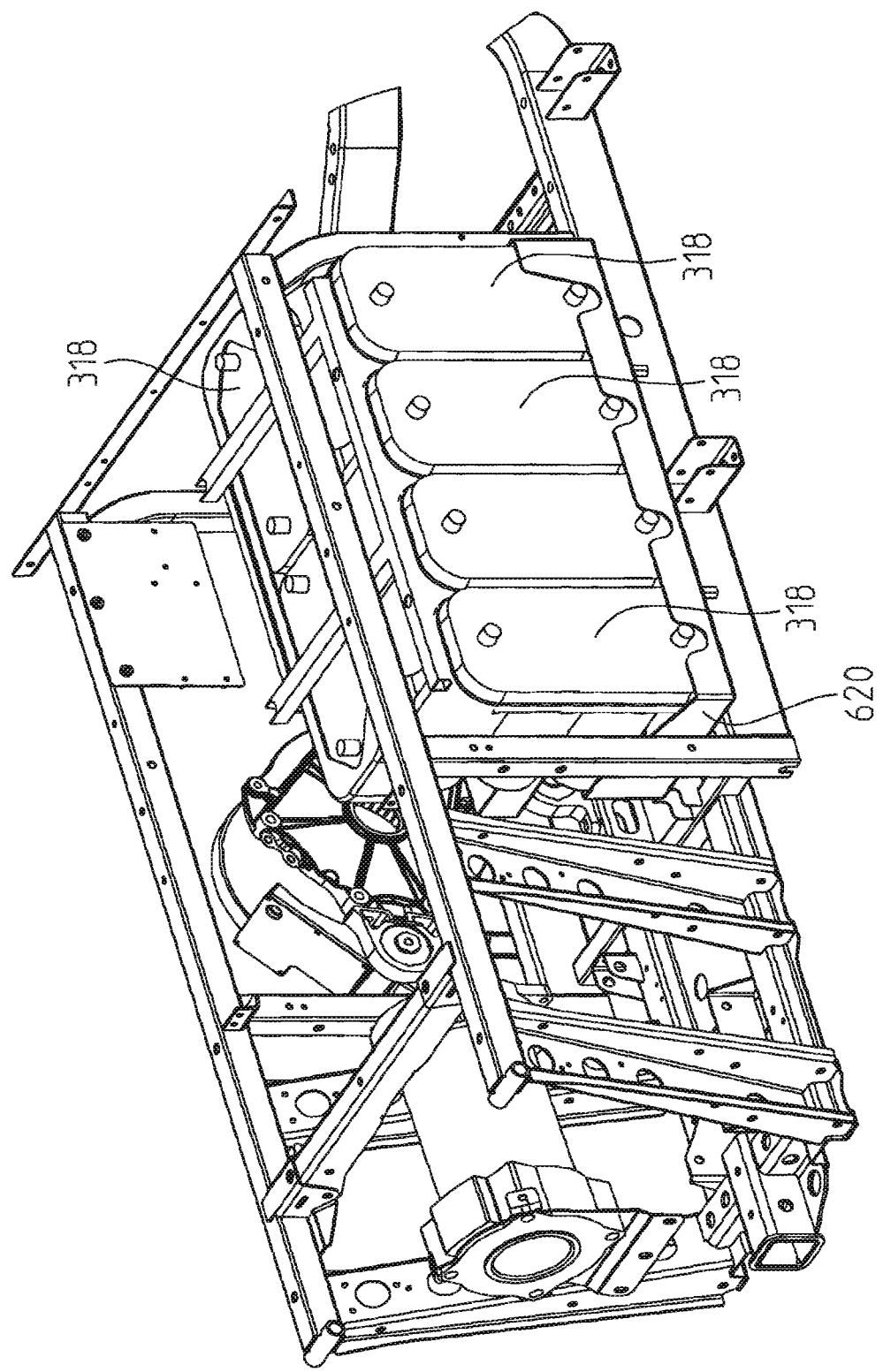
FIG. 30 shows a right rear perspective view of the vehicle of FIG. 28.

With reference now to FIGS. 28-33, the electrical system and the battery support structure will be described in greater detail. With reference first to FIG. 28, a battery support structure is shown generally at 600 and includes cross braces 602 which span cross bar 604 and cross brace 232 (FIG. 29). As shown best in FIG. 32, a tunnel 610 is positioned on top of cross bars 602 and provides two functions; first, tunnel 610 provides a support for battery tray 612 and second, tunnel 610 provides a channel 614 therethrough, as described herein.

Figure 22:
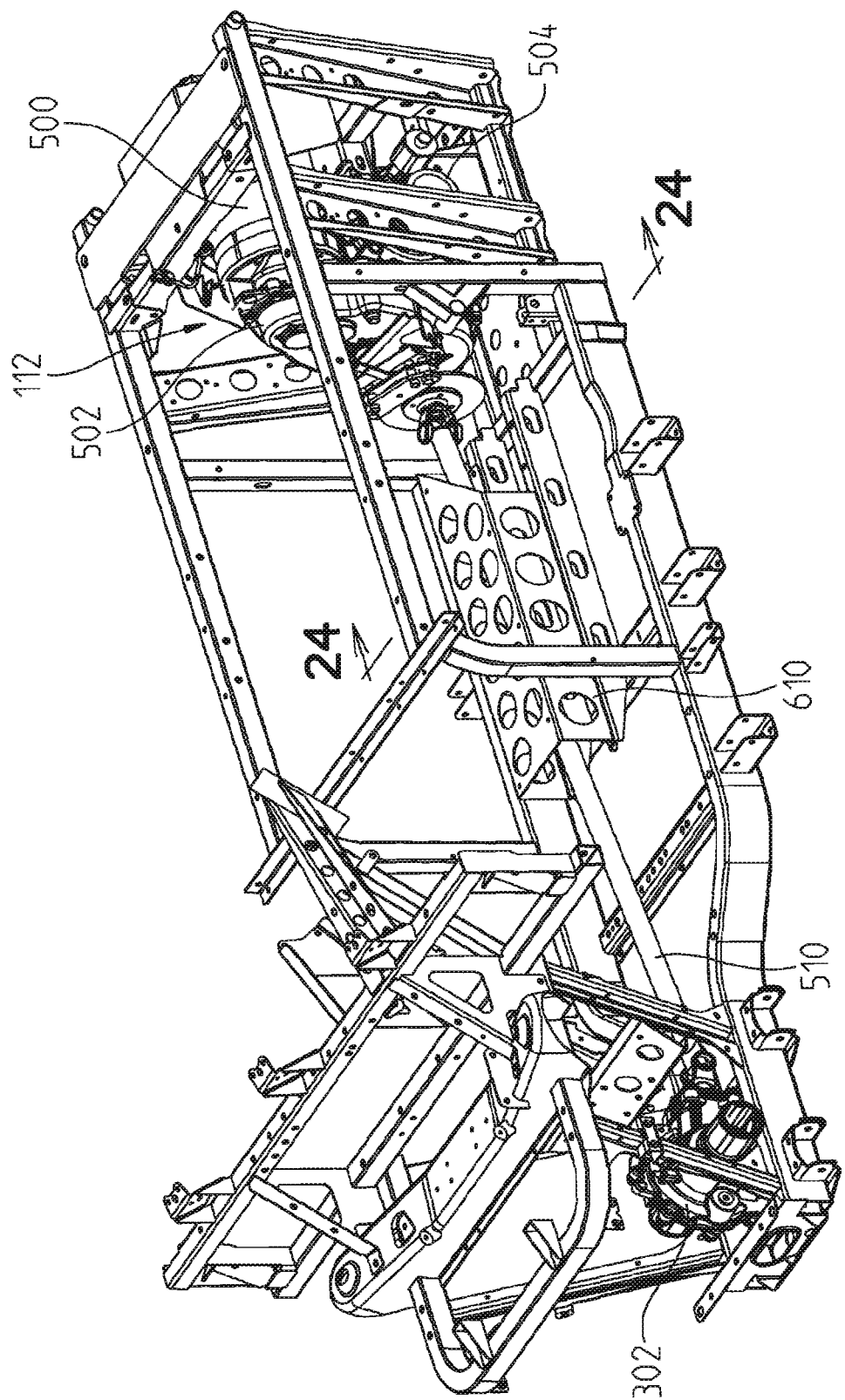
FIG. 22 illustrates a front left perspective view of the drive train of the subject vehicle.
Figure 23:
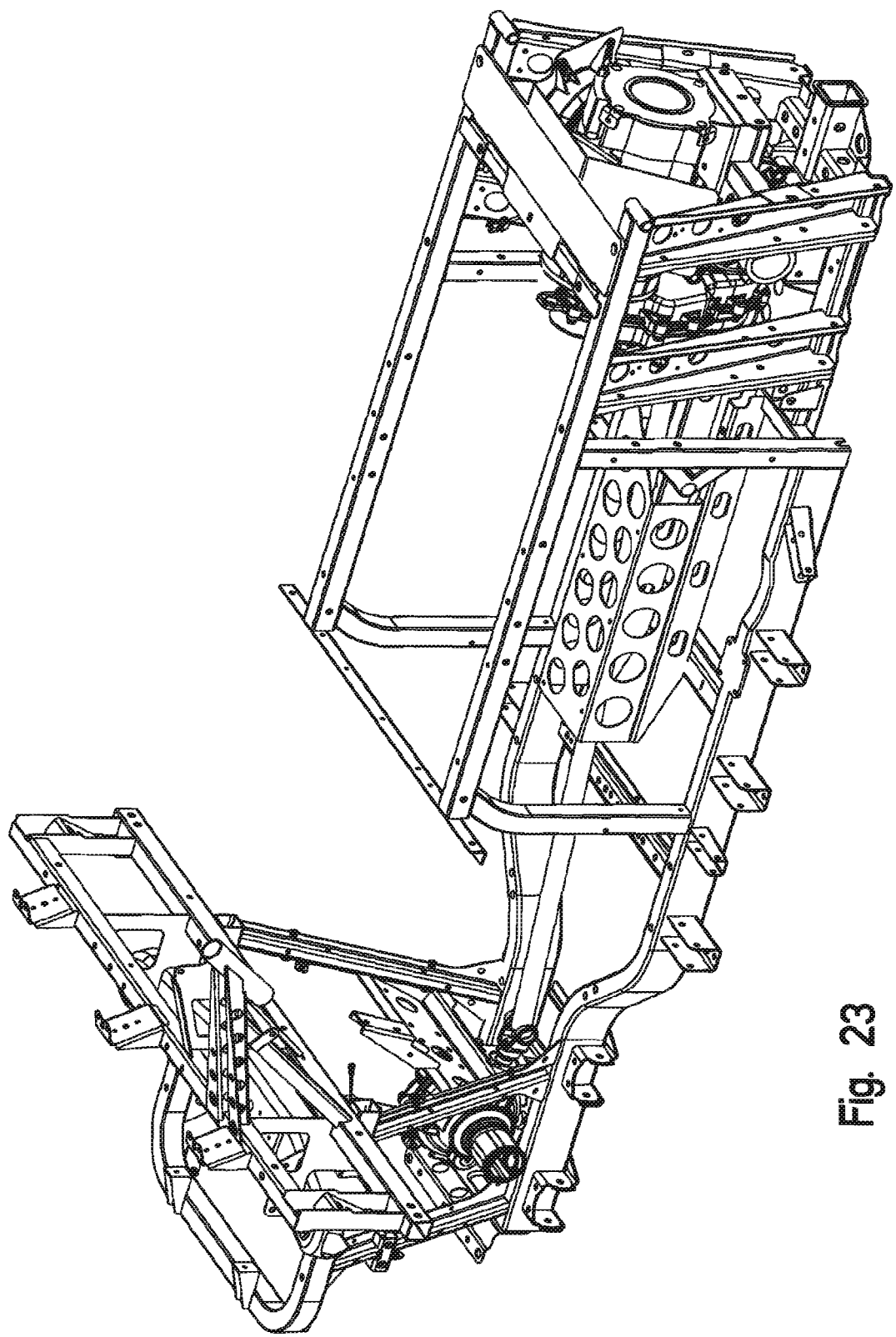
FIG. 23 shows a left rear perspective view of the vehicle of FIG. 22.
Figure 24:
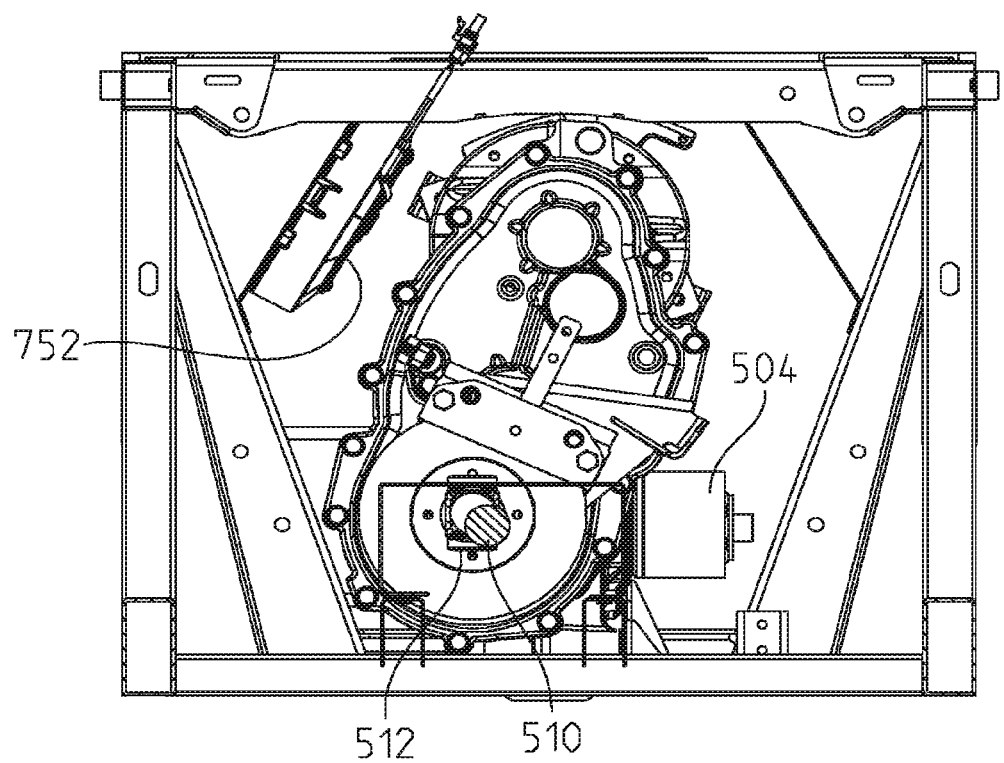
FIG. 24 is a cross sectional view taken through lines 24-24 of FIG. 22.
Figure 25:
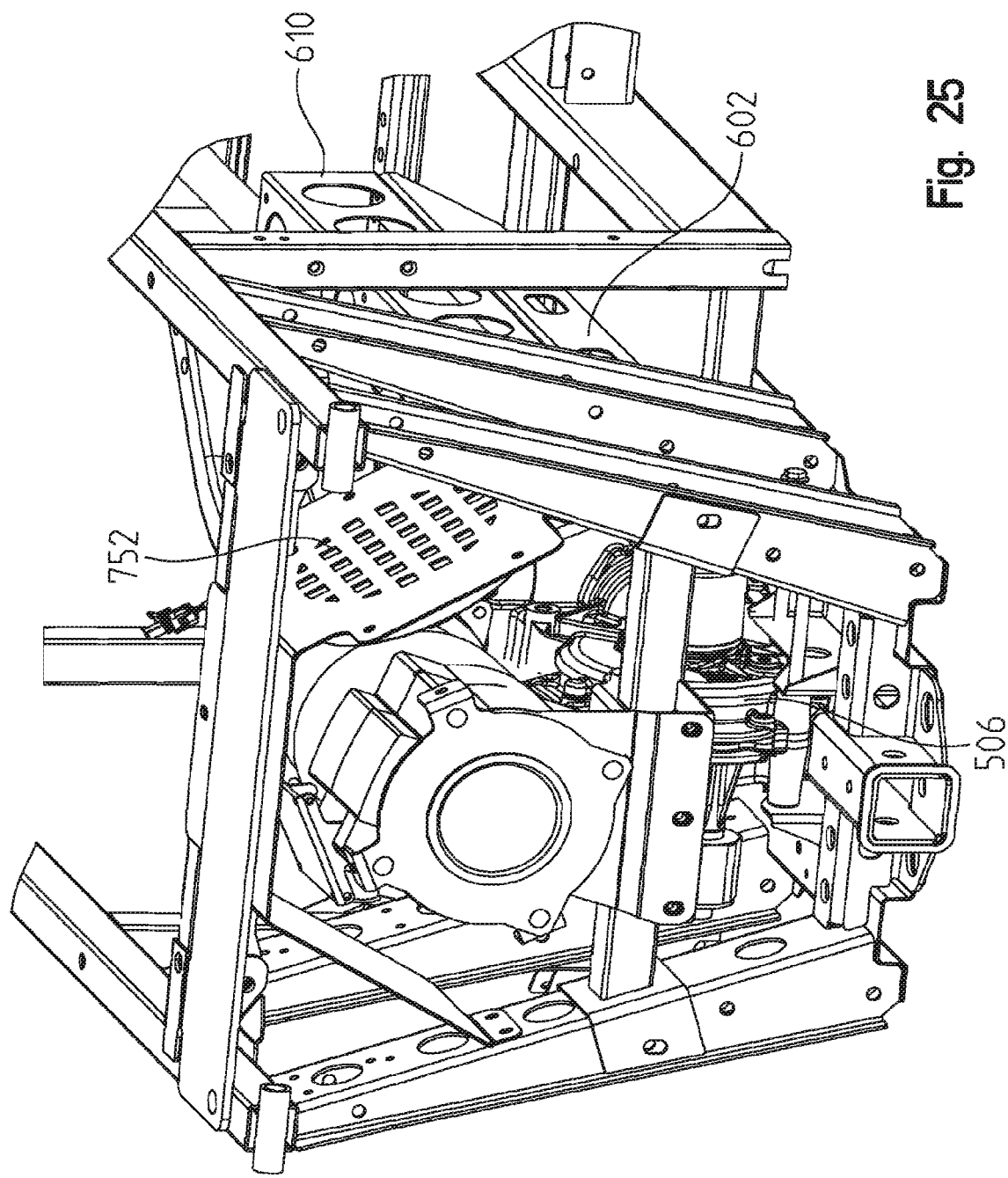
FIG. 25 is an enlarged view of the rear of the vehicle.
Figure 31:
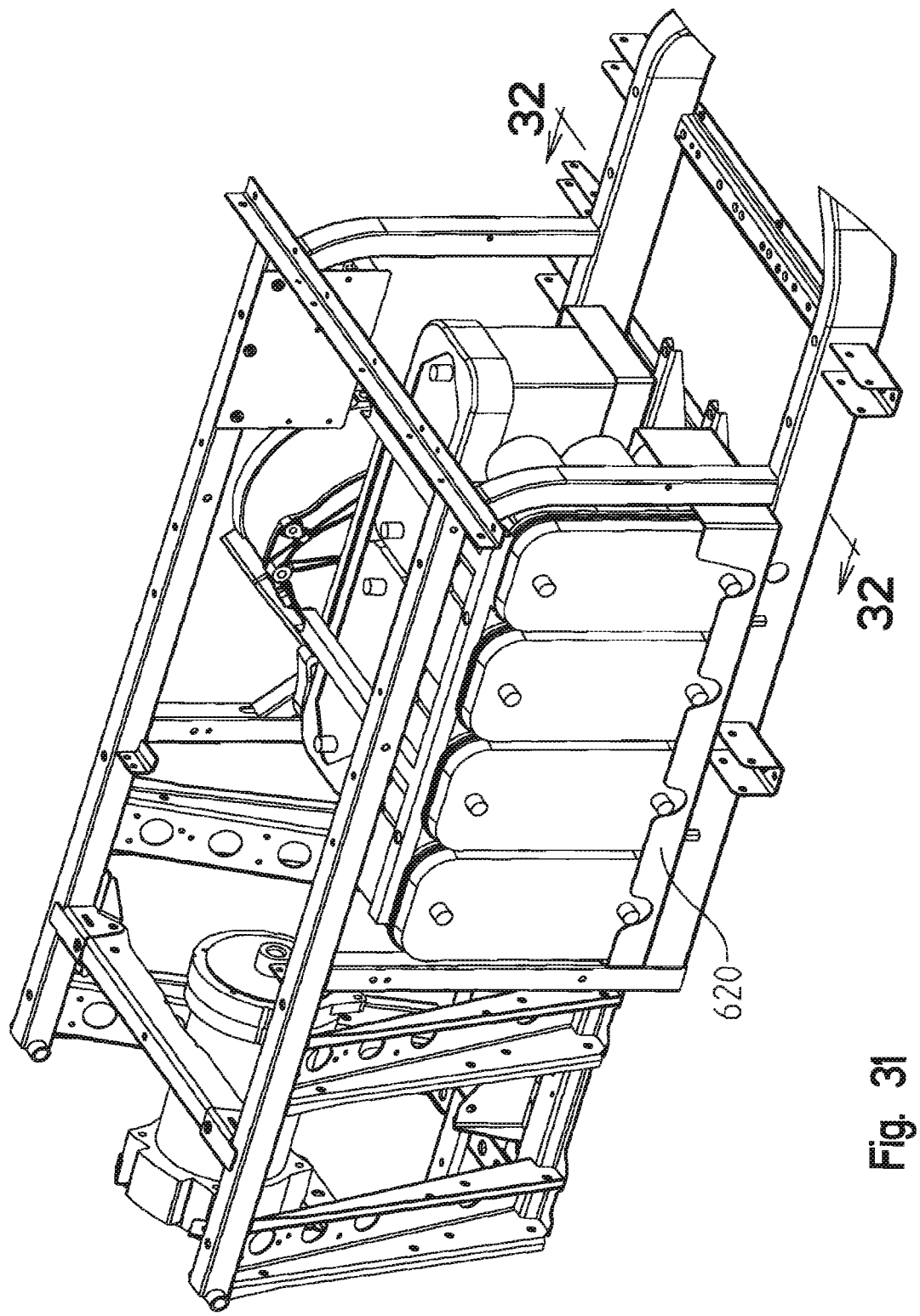
FIG. 31 shows a front right perspective view of the vehicle of FIG. 30.
Figure 32:
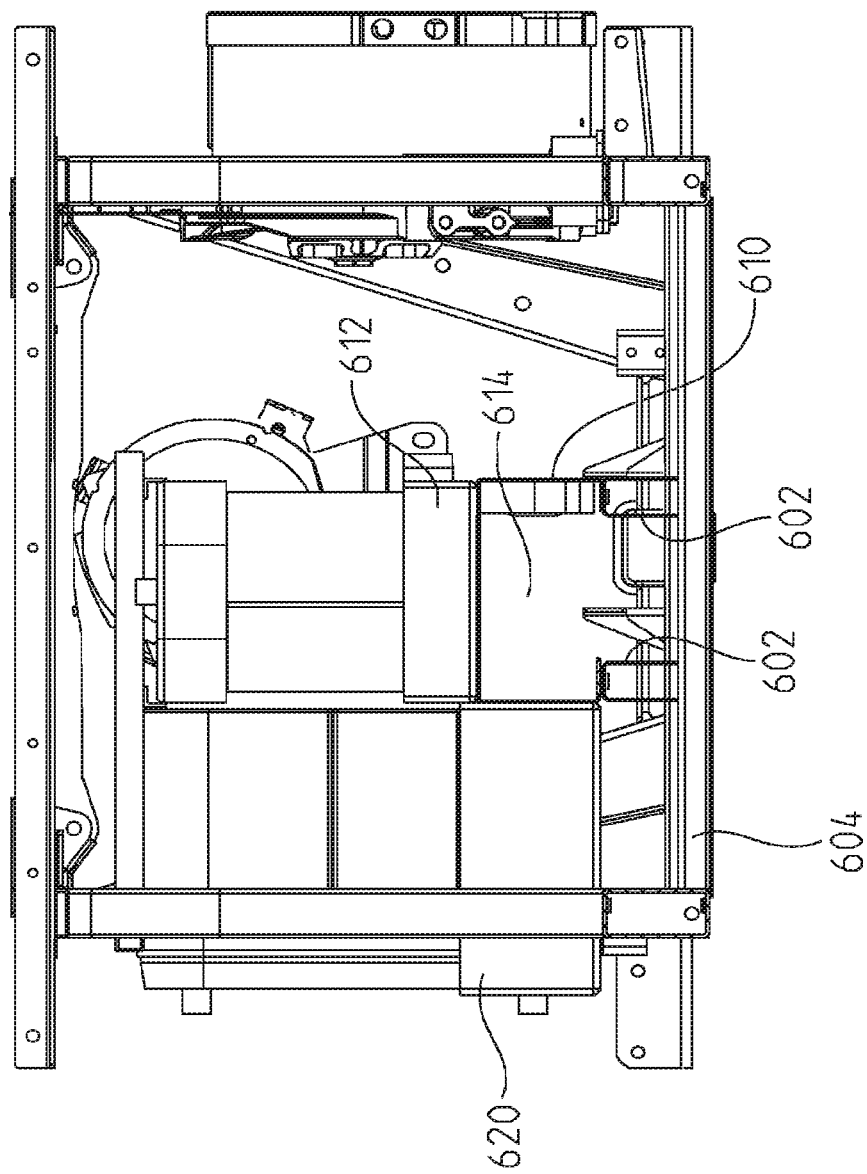
FIG. 32 shows a cross sectional view taken through lines 32-32 of FIG. 31.
Figure 33:
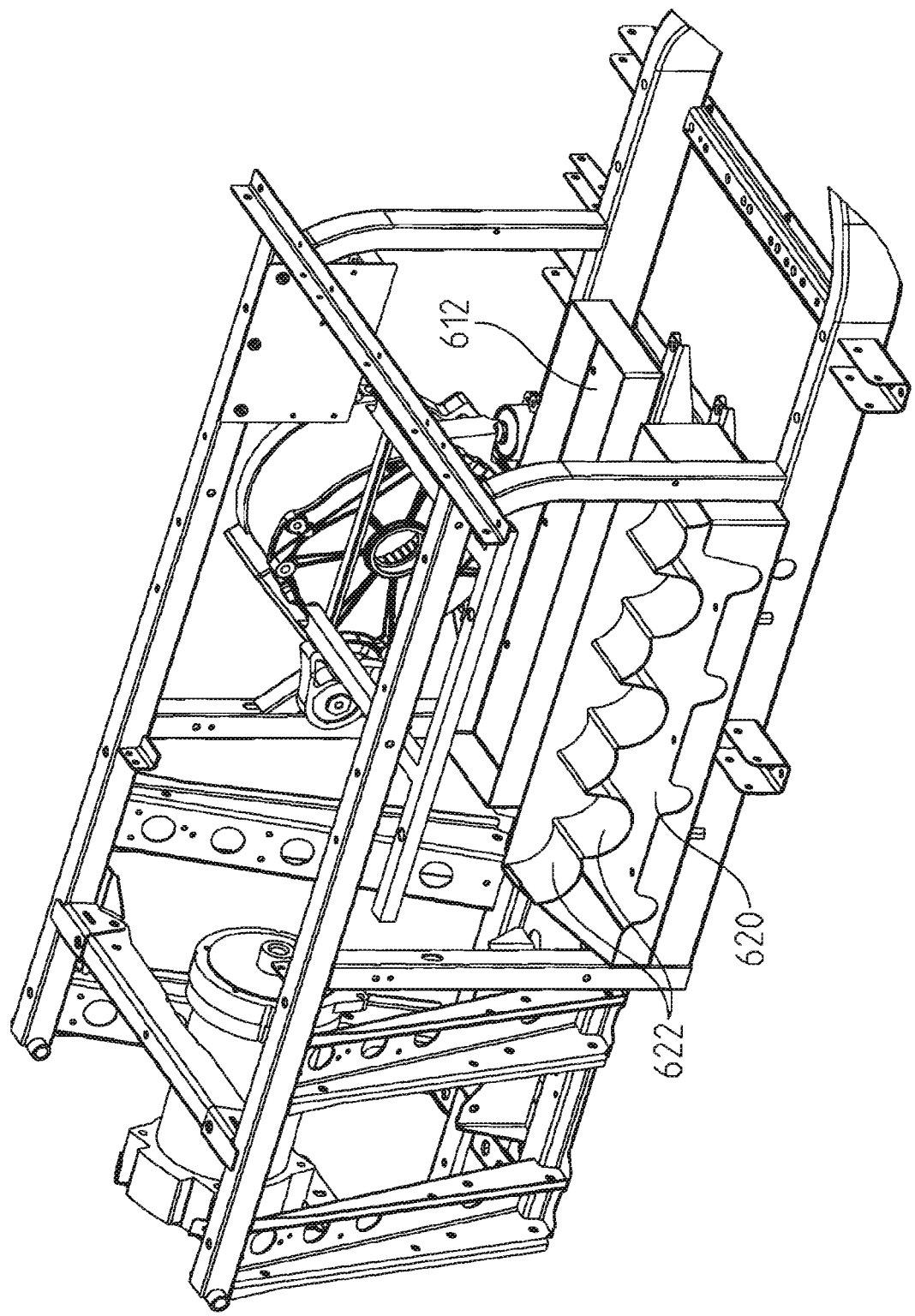
FIG. 33 is a view similar to that of FIG. 31 showing the batteries removed.

As shown in FIGS. 28 and 31, two batteries 318 are positioned longitudinally in a tandem relation in battery tray 612 and are supported by tunnel 610. Meanwhile a second battery tray 620 is positioned adjacent to battery tray 612 as shown best in FIGS. 32 and 33 where battery tray 620 includes a plurality of concavities such as 622 to receive the cells of the batteries in a horizontal position, such that the general orientation of the batteries is in an upright position as shown best in FIGS. 30 and 32. Thus it should be appreciated that the entirety of the battery packs 304, 306, engine and generator 320, 322, muffler 332, and fuel tank 340 are all illustratively positioned under the bench seat support 216. In one embodiment, muffler 332 is positioned towards rear end 202 of vehicle 100, and inverter 716 is positioned under the bench seat support 216 (see FIGS. 12B and 21B). It should also be appreciated that prop shaft 510 extends forwardly through channel 614 of tunnel 610 from transaxle 502 to front differential 302, as best illustrated in FIG. 22.

It should be understood then that as designed, vehicle 100 is an electric vehicle with an on-board engine and generator for charging the batteries and/or for providing power to traction motor 500 for extending the range of the vehicle. That is, on-board engine 320 does not directly mechanically connect to the drivetrain of the vehicle but rather operates for the purpose of generating power for traction motor 500 and/or a charge for the battery packs 304, 306. More particularly, the arrangement of engine 320, generator 322, and fraction motor 500 forms a battery-dominant, serial hybrid system. This battery-dominated architecture allows batteries 318 to meet the transient acceleration needs of vehicle 100 while engine 320 maintains the state-of-charge ("SOC") of batteries 318. In one embodiment, engine 320 is a single cylinder, four stroke engine having a displacement of about 300 to 325 cubic centimeters. For example, engine 320 may sufficiently power a 22 kW generator such that the generator may hold the battery SOC at sufficient levels to drive vehicle 100 at speeds of at least approximately 80 kilometers/hour (approximately 50 miles/hour).

As described below, vehicle 100 is also designed to maximize the vehicle range by sacrificing some of the vehicle weight by having fewer batteries than a typical all-electric vehicle, but adding weight by including a fuel tank with fuel, and in addition range extender 310. In the specific embodiment shown, the total vehicle weight (W) is 720 KG and with reference to FIG. 2, the weight distribution is 420 KG on the rear wheels and 300 KG on the front wheels, that is, $W_R$ equals 420 KG and $W_F$ equals 300 KG.

The above-described vehicle 100 has been configured for a maximum range of the vehicle. In the illustrated embodiment, the group of batteries 318 of the above vehicle 100 has less capacity and less weight than the battery packs of a typical all-electric vehicle. Further, the fuel capacity of vehicle 100 is less than a typical utility vehicle having an internal combustion engine. However, by sacrificing some of the vehicle weight from the battery pack and adding weight in fuel, the vehicle range is maximized. In the illustrated embodiment, of the total vehicle weight, the weight of the batteries is 156 KG, that is, six batteries at 26 KG per battery. The fuel tank is illustratively a 25-liter fuel tank with the weight of the fuel being approximately 18.6 KG. Thus, the weight of the batteries is approximately 21.6% of the total vehicle weight W, whereas the weight of the fuel is approximately 2.6% of the total vehicle weight W.

Thus, the vehicle 100 is preferably a vehicle having a total vehicle weight of up to approximately 1,250 KG (approximately 2,750 pounds). Illustratively, vehicle 100 may have a total vehicle weight between 675 and 750 KG. Vehicle 100 includes an electric drive train; a range extender 310 providing onboard charging for the battery packs 304, 306, where the range extender has an internal combustion engine with a fuel tank; and a plurality of batteries. More particularly, the internal combustion engine and fuel tank may be sized such that the total weight of the fuel is in the range of 1.5-3.5% of the total vehicle weight. Additionally, batteries 318 may be sized such that the total weight allocated to batteries 318 is in the range of 15-25% of the total vehicle weight. Additionally, the size and weight of at least battery packs 304, 306, engine 320, generator 322, and traction motor 500 is adjusted to allow maximum vehicle range for typical driving distances and speeds, rather than the extreme or "worst case scenario" driving conditions. By adjusting the size of engine 320 and generator 322 for sufficient electrical power under normal usage, rather than during peak acceleration demands, engine displacement may be small. Due to the decrease in size, engine 320 may be able to produce power over a range of RPM values that maximizes fuel efficiency. By correlating engine displacement with the average power needs of vehicle 100, engine 320 may operate with a throttle plate that is opened wider, which may avoid losses due to pumping and further improve efficiency.

Additionally, other factors may contribute to increased efficiency of engine 320 and, therefore, further contribute to the range of vehicle 100. For example, low rolling resistance tires, improved transmission efficiency, green telematics, and minimizing engine friction. Rotational engine friction in engine 320 may be minimized by rotating the components of engine 320 on roller bearings. For example, the balance shaft, camshaft, and crankshaft each may be mounted on roller bearings. Roller bearings may be more tolerant of debris and situations of low oil pressure than traditional plain bearings. As such, there is a decreased likelihood that the bearings will be damaged when operating engine 320 at an increased rpm and full load immediately after starting. By providing engine 320 with roller bearings, internal friction is reduced which improves overall efficiency and maximizes power output. Furthermore, roller bearings do not require oil pressure and, therefore, it is not necessary for engine 320 to include an oil pump, thereby further contributing to a weight reduction of vehicle 100 and improved efficiency thereof.

It is estimated that the above-described vehicle has been optimized in relation to an all electric or an all fuel vehicle. It is estimated that a similar vehicle of an all-electric drive would have a vehicle range of approximately 40 miles, without re-charging. On the other hand, it is estimated that a vehicle with an internal combustion engine only would have a vehicle range of approximately 80 miles with a single tank of fuel. However, it is estimated that the above-mentioned vehicle 100 may have a range of up to approximately 500 miles. More particularly, illustrative vehicle 100 may have a range of up to approximately 500 kilometers (approximately 310 miles), with a single tank of fuel by intermittently recharging the batteries while the vehicle is running For example, the illustrative embodiment of fuel tank 340 may be configured for approximately 6.5 gallons of fuel. It is also believed that the charging system 310 will maintain the vehicle battery charge at a constant level while operating such that the vehicle does not need to stop running to wait for the vehicle batteries to recharge. A more specific exemplary operation of the vehicle 100 is described below with reference to FIG. 34.

Figure 34:
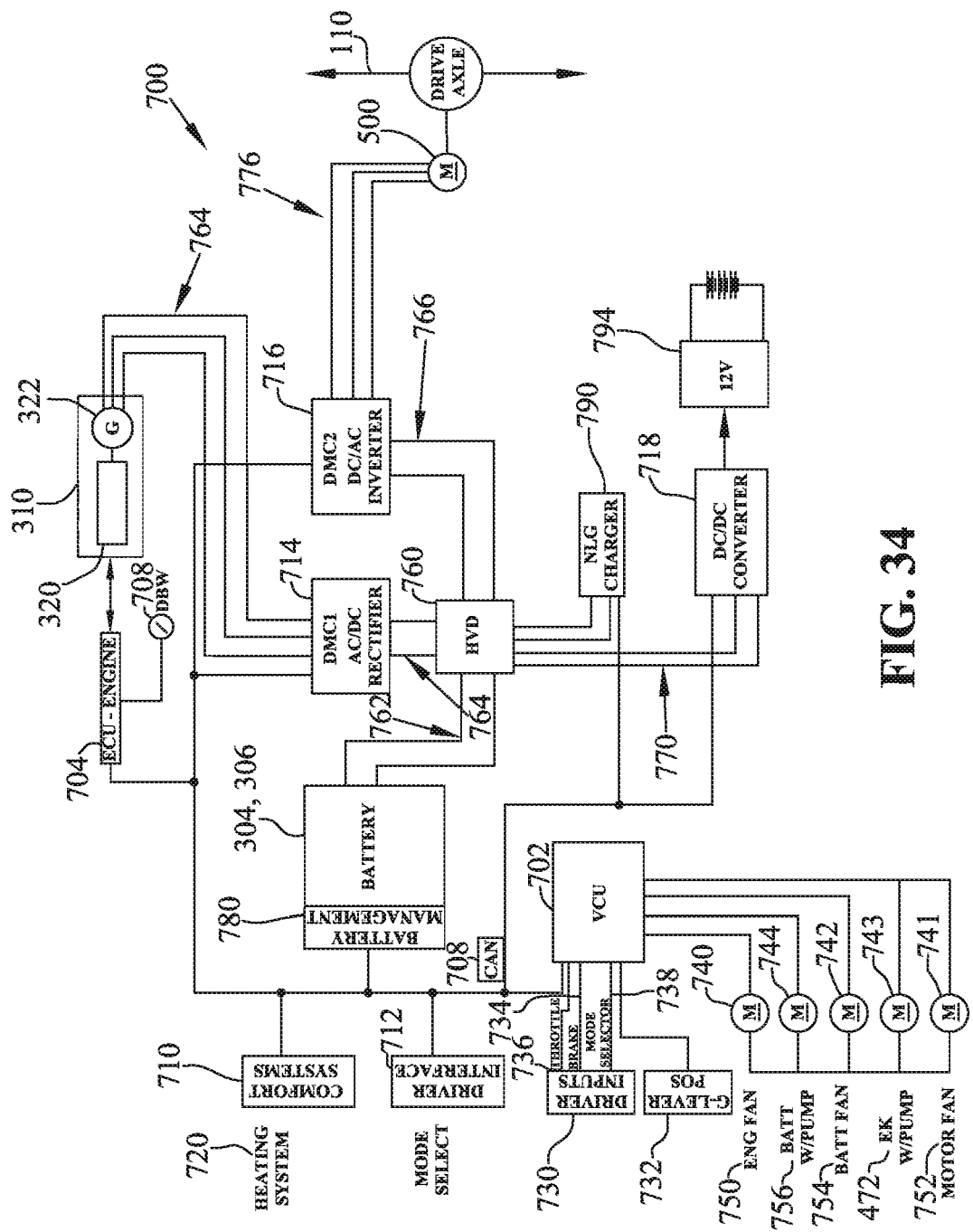
FIG. 34 is a schematic view of the electrical system of the vehicle.

As illustrated in FIG. 34, an electrical system 700 is configured to control the operation of the electric vehicle 100. In the illustrated embodiment, electrical system 700 includes the vehicle battery packs 304, 306 that provide electrical power to the vehicle motor 500 for driving the drive axle 110 of the electric vehicle. Range extender 310 serves to generate electrical power for utilization in electrical system 700, such as for charging vehicle battery packs 304, 306 or for powering vehicle motor 500 of the electric vehicle. Additionally, regenerative braking may assist in recovering a portion of the battery charge, as is further detailed herein. In the illustrative embodiment, electrical system 700 includes a vehicle control unit (VCU) 702 in communication with an electronic control unit (ECU) 704. Alternative embodiments may combine the functionality of VCU 702 and ECU 704 in a single component. In the illustrated embodiment, ECU 704 is an electronic controller configured to control the operation of engine 320 of range extender 310. ECU 704 illustratively provides control signals to the engine of range extender 310 via a drive-by-wire system 708. ECU 704 may control, for example, the throttle position, the engine speed, the ignition timing, and other parameters of the engine of range extender 310. As mentioned above, range extender 310 includes an electrical generator 322 coupled to and driven by the engine 320. In one embodiment, generator 322 operates to minimize the average current in and out of batteries 318 to extend the operating range of vehicle 100 and to increase the life of batteries 318.

VCU 702 is an electronic controller configured to control the electrical systems and subsystems of the electric vehicle. For example, VCU 702 may control fan and water pump motors, control and monitor vehicle speed and vehicle motor speed, receive and execute driver inputs and commands, and control the heating and cooling system of the electric vehicle. In one embodiment, VCU 702 includes a microprocessor having software that contains instructions for controlling the startup and operation mode of range extender 310. In the illustrated embodiment, VCU 702 is configured to apply switched voltage to ECU 704 according to control logic to start range extender 310. In one embodiment, ECU 704 controls the engine of range extender 310 using vehicle parameters provided by VCU 702. Alternatively, ECU 704 may include a microprocessor with software for executing control logic and for controlling range extender 310.

A communication network 708 is provided for communication between VCU 702 and various components and devices of electrical system 700. Communication network 708 illustratively uses controller area network (CAN-bus) protocol, although other suitable communication protocols between components of electrical system 700 may be used. In the illustrated embodiment, VCU 702 communicates with ECU 704, a comfort system 710, a driver interface 712, vehicle battery packs 304, 306, a rectifier 714, an inverter 716, and a converter 718 over communication network 708.

Comfort system 710 illustratively includes a heating system 720. In the illustrated embodiment, VCU 702 controls the operation of heating system 720. Driver interface 712 may include user inputs that allow a user to adjust the settings of the comfort system 710 of the electric vehicle. Cooling system 350 of range extender 310 may be configured to heat operator area 130 by providing hot water to the temperature control system of vehicle 100. Heating with range extender 310 may be more efficient than electrical heating, thereby contributing to user comfort without significant loss to the range of vehicle 100. For example, heating operator area 130 with range extender 310 may operate at approximately 60% efficiency compared to approximately 15-20% efficiency for electrical heating.

Electrical system 700 further includes driver inputs 730 and a gear selector 732. Driver inputs 730 illustratively include a brake input 734, a throttle input 736, and a mode selector 738. Brake input 734 provides a signal to VCU 702 that causes VCU 702 to slow or stop movement of the electric vehicle by applying brakes to the wheels, for example, of the electric vehicle. In the illustrated embodiment, the electric vehicle includes a regenerative braking system that works in tandem with a mechanical brake. In particular, the mechanical brake is configured to assist with braking when the regenerative brake is unable to apply adequate braking force to meet the brake input demand. Throttle input 736 provides a signal to VCU 702 representative of the position of a throttle input device, such as a pedal, lever, or twist-grip device. In response, VCU 702 controls the speed and torque of vehicle motor 500 based on the signal provided with throttle input 736.

Mode selector 738 provides signals to VCU 702 representative of a selected operating mode and selected driving mode of the electric vehicle. The operating modes include a pure electric mode and a range extended (REX) mode. In the pure electric mode, the range extender 310 is turned off and the motor 500 is powered by batteries 318. Accordingly, the operating range of vehicle 100 is dependent on the energy storage capacity of batteries 318, as well as the weight of vehicle 100 and its cargo and passengers and the terrain traversed by vehicle 100. The electric mode provides low-noise operation of vehicle 100 suitable for hunting, military, and residential applications, for example, or other suitable applications. In the REX mode, range extender 310 is activated and cooperates with batteries 318 to provide power for driving vehicle 100, as described herein. The operating range of vehicle 100 in the REX mode depends on the availability of fuel for powering engine 320 of range extender 310.

Exemplary driving modes provided with mode selector 738 include a low mode and a high mode. In the illustrated embodiment, the pure electric operating mode and the REX operating mode each have a corresponding high and low driving mode. The low mode provides better vehicle performance (i.e., higher torque, acceleration rate) as compared to the high mode, while the high mode provides better efficiency and operating range as compared to the low mode.

In the pure electric low mode, the torque output of motor 500 is higher than in the high mode, and the maximum speed of vehicle 100 is limited. In addition, the current output from batteries 318 is also limited. In the pure electric high mode, the acceleration and torque of vehicle 100 are limited to provide smoother torque at low vehicle speeds, and the maximum speed limit of vehicle 100 is higher than in the low mode. In the REX low mode, the average energy consumption of motor 500 is provided from the range extender 310, while the batteries 318 provide limited or no power to motor 500. In addition, full current is available to motor 500, and the maximum speed of motor 500 is limited. In the REX high mode, both the batteries 318 and range extender 310 are configured to provide full power to motor 500, and the maximum speed of vehicle 100 is not limited or is limited to a speed higher than that of the low mode. In one embodiment, mode selector 738 comprises two inputs accessible by an operator: one input for selecting the operating mode and one input for selecting the driving mode.

Gear selector 732 provides a signal to VCU 702 representative of a selected gear of operation of the electric vehicle. In the illustrated embodiment, gear selector 732 includes a forward gear, a reverse gear, and neutral. Gear selector 732 and mode selector 738 may be in the form of a rocker or toggle switch, a button, a lever, touch screen or other suitable device configured to receive a user input for selecting the mode or gear of operation of the vehicle.

In one embodiment, vehicle 100 includes an auxiliary power mode. The auxiliary power mode is available in the pure electric, or low-noise, operating mode where the batteries 318 provide auxiliary power and the REX operating mode where the range extender 310 provides the auxiliary power. In the pure electric (REX-disabled) auxiliary power mode, batteries 318 are configured to run electrically powered equipment (e.g., instrument panel, vehicle lights, LCD display) when the vehicle is not moving. In addition, the auxiliary power is configured to shut off when the batteries 318 have discharged to a minimum state of charge. In the REX-enabled auxiliary power mode, range extender 310 is operated to run the electrically powered equipment or to charge batteries 318 when vehicle 100 is not moving. The voltage provided in auxiliary power mode may be 110/230 V AC or 12/24 V DC when vehicle 100 is not moving (i.e., vehicle 100 is stopped or at a standstill) and when vehicle 100 is moving, for example. In one embodiment, in the REX-enabled mode, range extender 310 may be operated to hold a battery state of charge at a certain level during operation of vehicle 100 or to increase the charge of batteries 318 during operation of vehicle 100. In one embodiment, auxiliary power mode is automatically activated when the parking brake is engaged, the drive switch (e.g. gear selector 732) is in neutral, and, in the pure electric operating mode, when charger 790 is connected to an external power source. The auxiliary power mode may also be selected with an input at driver interface 712. In one embodiment, range extender 310 may be operated to power electrically powered work tools or implements attached to vehicle 100.

Vehicle 100 may also have fans and water pumps to cool various vehicle components. In the illustrated embodiment of FIG. 34, VCU 702 controls the operation of fan motors 740, 741 and 742 and water pump motors 743 and 744. Fan motors 740, 741 and 742 may be single phase or three phase motors. Fan motor 740 illustratively drives an engine fan 750 for cooling the engine 320 of range extender 310 when the engine reaches high temperature levels. Fan motor 741 drives motor fan 752 (see FIG. 24) that cools drive motor 500 when motor 500 reaches a high temperature level. Fan motor 742 and water pump motor 744 illustratively drive a battery fan 754 and battery water pump 756, respectively, for cooling vehicle battery packs 304, 306 and related battery circuitry of electrical system 700. Water pump motor 743 illustratively drives water pump 472 (FIG. 21B) for cooling the electrical components and circuitry of electrical system 700, including rectifier 714, inverter 716, ECU 704, VCU 702, generator 322, converter 718, and/or vehicle motor 500. In one embodiment, the electrical circuit of electrical system 700 is maintained at a temperature of about 60 degrees or less.

Vehicle battery packs 304, 306 are configured to provide power to vehicle motor 500 for driving the electric vehicle. In one embodiment, vehicle battery packs 304, 306 are configured to provide a voltage output of about 72 V. In one embodiment, battery packs 304, 306 are rated to supply a combined current of up to 975 A and a combined power of 61 kW for short durations. Batteries 318 may have other suitable current and power ratings. Vehicle battery packs 304, 306 are coupled to vehicle motor 500 via a voltage distributor 760. Voltage distributor 760 is illustratively a high voltage distribution box configured to route voltage received from vehicle battery packs 304, 306 and from range extender 310 to appropriate devices in electrical system 700. In the illustrated embodiment, voltage distributor 760 is coupled to vehicle battery packs 304, 306 via wires 762, to rectifier 714 via wires 764, to inverter 716 via wires 766, and to DC/DC converter 718 via wires 770. Wires 762, 764, 770, and 766 illustratively include hot and ground wire pairs capable of transferring high voltage between the respective components.

Voltage distributor 760 routes the electrical power received from vehicle battery packs 304, 306 to DC/AC inverter 716. Inverter 716 includes power electronics configured to convert the DC voltage from voltage distributor 760 to AC voltage and to provide the AC voltage to vehicle motor 500 via motor cables 776. An exemplary inverter 716 is a Dual SKAI inverter system available from Semikron. In one embodiment, inverter 716 is positioned below the bench seat support 216 (FIG. 5) of vehicle 100 and adjacent range extender 310. In one embodiment, vehicle motor 500 is a three-phase AC asynchronous motor having a power rating of about 15 kW, although other suitable power ratings may be provided. In one embodiment, motor 500 is a permanent magnet motor having a power rating of about 26 kW. In a further embodiment, vehicle motor 500 may have a power rating of approximately 85 kW. In one embodiment, a regenerative braking system is utilized to generate electrical energy from the kinetic energy of the vehicle during vehicle braking In particular, the kinetic energy of the vehicle is used to drive vehicle motor 500 in the opposite direction, thereby causing vehicle motor 500 to generate electrical energy that is fed back through voltage distributor 760. The generated electrical energy may then be stored in vehicle battery packs 304, 306 or used to preheat catalytic converter 330 of range extender 310, for example. Alternatively, a separate motor may be used for the regenerative braking Generator 322 provides electrical power to AC/DC rectifier 714 via cables 764. In the illustrated embodiment, generator 322 is a three-phase motor that is operated in reverse to function as an electricity generator. In particular, the engine 320 of range extender 310 drives generator 322 and causes generator 322 to produce AC power provided to rectifier 714. Rectifier 714 converts the AC voltage received from electrical generator 322 to DC voltage. Voltage distributor 760 routes the generated DC voltage received from rectifier 714 to the appropriate destination in electrical system 700, such as to charge battery packs 304, 306 or to drive vehicle motor 500 directly. In one embodiment, generator 322 also serves as a starter for the engine 320 of range extender 310. In particular, vehicle battery packs 304, 306 may provide a voltage to the motor of generator 322 via cables 764, causing the motor of generator 322 to rotate in the forward direction to start the engine 320 of range extender 310. As such, an additional starter motor and alternator is not required, thereby reducing the size and weight of range extender 310.

In one embodiment, generator 322 is a permanent magnet synchronous electric machine with a power output of about 22 kW at 72 V, although another suitable generator may be provided. For example, it is contemplated that generator 322 may have a 400 V capacity. In one embodiment, the combined weight of generator 322 and engine 320 is about 32 KG.

Vehicle battery packs 304, 306 illustratively include a battery manager 780 that manages various parameters of vehicle battery packs 304, 306. In one embodiment, battery manager 780 includes a computer with software that contains limits for the discharge rate, the charge rate, the maximum and minimum voltage, and the maximum and minimum temperature of battery packs 304, 306. In particular, battery manager 780 may monitor the level of charge in vehicle battery packs 304, 306 and initiate a control event detected by VCU 702 when the charge of vehicle battery packs 304, 306 reach a predetermined level. For example, when the stored charge reaches a predetermined low level, battery manager 780 may provide VCU 702 with a "low voltage" warning. In response, VCU 702 may instruct ECU 704 to start the range extender 310 to generate more electrical energy that is fed back into electrical system 700 for charging vehicle battery packs 304, 306. Similarly, when the stored charge of vehicle battery packs 304, 306 reaches a predetermined high level, battery manager 780 may provide VCU 702 with a "high voltage" warning. In response, VCU 702 may instruct ECU 704 to stop or reduce the generation of electrical energy by generator 310. In the illustrated embodiment, battery manager 780 is configured to communicate with various devices, including VCU 702, on communication network 710 to assist with the management of battery packs 304, 306.

Vehicle 100 may also have an on board charger 790 configured to couple to an external power source for charging battery packs 304, 306. In one embodiment, charger 790 is a plug-in charger that connects to and draws electrical power from an electrical outlet. DC/DC converter 718 converts DC voltage from battery packs 304, 306 to a lower voltage level to provide a battery source 794. Battery source 794, illustratively 12 volts, may be utilized by low-voltage devices of the electric vehicle, such as lights and the instrument panel.

EXAMPLE 1

Conventional Automobile Applications

A sub-compact test vehicle, modeled after the European-market Volkswagen® Polo, includes the features detailed herein. More particularly, the test vehicle includes an 85 kW drive motor coupled to both a differential and a single-speed transmission having a ratio of 8:1. The test vehicle further includes a single cylinder engine with a 300 cubic centimeter displacement that is coupled to a generator having an output of 22 kW and 440 V. Additionally, batteries having a capacity of 12.5 kW/hour are included on the test vehicle.

The test vehicle was driven to determine the vehicle range in various driving modes and the emissions efficiency. In particular, the emissions testing was conducted according to the New European Driving Cycle ("NEDC"), which attempts to simulate typical car usage in Europe. The NEDC consists of four repeated ECE-15 driving cycles and an Extra-Urban driving cycle. The testing data and information showed that this test vehicle has a range of approximately 60 miles in an electric mode, and a range greater than approximately 300 miles (approximately 500 kilometers) for a single tank of fuel when in a hybrid/REX mode. The illustrative embodiment vehicle may have a fuel tank with approximately 6.5 gallons. Furthermore, the emissions tests showed that the test vehicle's $CO_2$ exhaust emissions are approximately 22 g/kW/hr in the mixed NEDC for hybrid electric cars.

EXAMPLE 2

Off-Road Vehicle Applications

An off-road test vehicle, modeled after the Ranger EV vehicle by Polaris Industries Inc. of Medina, Minn., has been built to include the features detailed herein. More particularly, the test vehicle includes a single cylinder engine with a 300 cubic centimeter displacement that is coupled to a generator having an output of 20 kW and 72 V. Alternatively, a generator with an output of 20 kW and 400 V may be used. Additionally, the test vehicle includes lead-acid battery packs, which do not require battery heating and/or cooling systems. Alternatively, lithium ion or other similar battery packs may be used, depending on the application of the test vehicle. This test vehicle may be used in any of the three operating modes and the stationary power generation mode detailed herein.

The range of this test vehicle was determined through driving tests. In particular, when the test vehicle is in the first, or pure electric, operating mode, the vehicle range is approximately 30 miles to approximately 50 miles, depending on the duty cycle. Other testing included heat signature tests. In particular, the heat signature of the test vehicle operating in the first mode was compared the heat signature of the test vehicle while operating in the other modes. It was determined that the heat signature in the first mode is less than the heat signature in the other modes because the heat load is produced only for powering the electronics and drive motor. Additionally, the oil sump of the REX engine and generator provides additional cooling for the electronics and drive motor. Furthermore, a sound level test was performed and it was concluded that the sound level in the first mode is lower than that of the other operating modes.

When the test vehicle is operated in the second operating mode, the fuel efficiency increases when compared to the third mode. Additionally, the vehicle range increases when the test vehicle is operated in the second mode relative to that of the third mode.

When the vehicle is operated in the third mode, rather than the second mode, test results show that the fuel efficiency and vehicle range decreases.

When the vehicle is operated in the fourth, or non-driving, mode, the test vehicle may output approximately 7 kW to approximately 20 kW of auxiliary power.

EXAMPLE 3

Heavy Fuel Applications

The features detailed herein may be applied to vehicles with heavy-fuel (e.g., diesel) engines. In particular, the test vehicle may include a relatively small (e.g., less than one liter), high-powered, dense internal combustion engine. The engines may be configured in a naturally-aspirated or turbocharged form to accommodate specific power needs. It is contemplated that the decreased size of the engine will reduce emissions and fuel consumption.

While this invention has been described as having an exemplary design, the present invention may be further modified within the spirit and scope of this disclosure. The application is, therefore, intended to cover any variations, uses, or adaptations of the invention using its general principles. Further, this application is intended to cover such departures from the present disclosure as come within known or customary practice in the art to which this invention pertains.

What is claimed is:

1. A vehicle, comprising:
a frame having a front portion, mid portion and rear portion, the frame having a longitudinal centerline;
front and rear wheels supporting the frame;
side by side seating positioned adjacent the frame mid portion;
a tunnel portion extending under the side by side seating;
an electric drivetrain supported by the frame, and comprising an electric motor positioned rearward of the side by side seating and drivingly coupled to the rear wheels, a drive shaft extending through the tunnel and extending forwardly and being drivingly coupled to the front wheels, and at least one battery supported by the tunnel and positioned under the side by side seating;
an engine generator assembly positioned under the side by side seating and electrically coupled to the battery; and
a fuel tank for storing fuel for the engine generator.

2. The vehicle of claim 1, wherein the longitudinal centerline of the vehicle extends through the tunnel.

3. The vehicle of claim 1, wherein the vehicle comprises a plurality of batteries each supported by the tunnel.

4. The vehicle of claim 3, wherein the tunnel has a top surface raised from a vehicle floorboard, and at least two batteries are placed end to end on the tunnel.

5. The vehicle of claim 4, wherein battery posts on the at least two batteries extend vertically and upwardly.

6. The vehicle of claim 4, wherein at least two additional batteries are positioned adjacent to the tunnel and under the side by side seating with an end wall adjacent to the floorboard, and the at least two additional batteries extend side by side.

7. The vehicle of claim 6, wherein battery posts on the at least two additional batteries extend horizontally and transversely of the longitudinal centerline.

8. The vehicle of claim 6, wherein the engine generator assembly is positioned adjacent the vehicle floorboard and on an opposite side of the at least two batteries as said at least two additional batteries.

9. The vehicle of claim 8, wherein the engine generator is positioned under the seat.

10. The vehicle of claim 6, wherein the fuel tank is positioned under the side by side seating, and on an outside of the additional two batteries.

11. The vehicle of claim 1, wherein the tunnel portion extends substantially parallel to the longitudinal centerline.

12. The vehicle of claim 1, further comprising at least one additional battery positioned adjacent to the tunnel and under the side by side seating.

13. The vehicle of claim 1, wherein the at least one battery is positioned in a tray, and the tray is supported by a top surface of the tunnel.

* * * * *